: US 12,108,037 B2
(45) Date of Patent: *Oct. 1, 2024

(12) United States Patent
Du et al.

(54) LOOP FILTER BLOCK FLEXIBLE PARTITIONING

(71) Applicant: TENCENT AMERICA LLC, Palo Alto, CA (US)

(72) Inventors: Yixin Du, Los Altos, CA (US); Liang Zhao, Los Altos, CA (US); Xin Zhao, Los Altos, CA (US); Shan Liu, Los Altos, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/956,392

(22) Filed: Sep. 29, 2022

(65) Prior Publication Data
US 2023/0029856 A1 Feb. 2, 2023

Related U.S. Application Data

(63) Continuation of application No. 17/067,054, filed on Oct. 9, 2020, now Pat. No. 11,516,469.

(60) Provisional application No. 62/984,096, filed on Mar. 2, 2020.

(51) Int. Cl.
H04N 19/117 (2014.01)
H04N 19/119 (2014.01)
H04N 19/176 (2014.01)
H04N 19/46 (2014.01)
H04N 19/70 (2014.01)
H04N 19/80 (2014.01)

(52) U.S. Cl.
CPC .......... *H04N 19/117* (2014.11); *H04N 19/119* (2014.11); *H04N 19/176* (2014.11); *H04N 19/46* (2014.11); *H04N 19/70* (2014.11); *H04N 19/80* (2014.11)

(58) Field of Classification Search
CPC .. H04N 19/117; H04N 19/119; H04N 19/176; H04N 19/46; H04N 19/70
See application file for complete search history.

(56) References Cited

U.S. PATENT DOCUMENTS

| 10,158,869 B2 | 12/2018 | Shibayama et al. |
| 2014/0086333 A1 | 3/2014 | Wang |
| 2015/0195582 A1 | 7/2015 | Moriya et al. |
| 2017/0244975 A1 | 8/2017 | Huang et al. |

(Continued)

OTHER PUBLICATIONS

Jianle Chen, et al., "Algorithm description for Versatile Video Coding and Test Model 7 (VTM 7)", Joint Video Experts Team (JVET) of ITU-T SG 16 WP 3 and ISO/IEC JTC 1/SC 29/WG 11 16th Meeting: Geneva, CH, Oct. 1-11, 2019, pp. 1-89.

(Continued)

*Primary Examiner* — Jonathan R Messmore
(74) *Attorney, Agent, or Firm* — Morgan, Lewis & Bockius LLP

(57) ABSTRACT

A method of loop filtering in a video coding process comprises receiving image data; analyzing the image data; flexibility partitioning the image data into loop filtering blocks (LFBs) to allow the size of LFBs in at least one of a first row and a first column in a same frame to be smaller than other LFBs within the same frame; and applying a loop filter to the LFBs.

19 Claims, 24 Drawing Sheets

(56) References Cited

U.S. PATENT DOCUMENTS

| | | | |
|---|---|---|---|
| 2018/0014028 A1 | 1/2018 | Liu et al. | |
| 2018/0063527 A1 | 3/2018 | Chen et al. | |
| 2018/0160116 A1 | 6/2018 | Kim et al. | |
| 2020/0260104 A1* | 8/2020 | Piao | H04N 19/647 |

OTHER PUBLICATIONS

Benjamin Bross, et al., "Versatile Video Coding (Draft 7)", Joint Video Experts Team (JVET) of ITU-T SG 16 WP 3 and ISO/IEC JTC 1/SC 29/WG 11 16th Meeting: Geneva, CH, Oct. 1-11, 2019, pp. 1-492.

K. Misra, et al., "CE5-related: On the design of CC-ALF ", Joint Video Experts Team (JVET) of ITU-T SG 16 WP 3 and ISO/IEC JTC 1/SC 29/WG 11 16th Meeting: Geneva, CH, Oct. 1-11, 2019, pp. 1-6.

Kiran Misra, et al., "Cross-Component Adaptive Loop Filter for chroma", Joint Video Experts Team (JVET) of ITU-T SG 16 WP 3 and ISO/IEC JTC 1/SC 29/WG 11 15th Meeting: Gothenburg, SE, Jul. 3-12, 2019, pp. 1-9.

Jonathan Taquet, et al., "CE5: Results of tests CE5-3.1 to CE5-3.4 on Non-Linear Adaptive Loop Filter.", Joint Video Expers Team (JVET) of ITU-T SG 16 WP 3 and ISO/IEC JTC 1/SC 29/WG 11 14th Meeting: Geneva, CH, Mar. 19-27, 2019, pp. 1-10.

Chia-Yang Tsai, et al., "TE10 Subtest2: Coding Unit Synchronous Picture Quadtree-based Adaptive Loop Filter", Joint Collaborative Team on Video Coding (JCT-VC) of ITU-T SG16 WP3 and ISO/IEC JTC1/SC29/WG113rd Meeting: Guangzhou, CN, Oct. 7-15, 2010, pp. 1-12.

Thomas J. Daede, et al., "Daala: A Perceptually-Driven Next Generation Video Codec", Mar. 10, 2016, pp. 1-10.

Benjamin Bross, et al., "Versatile Video Coding (Draft 6)", Joint Video Experts Team (JVET) of ITU-T SG 16 WP 3 and ISO/IEC JTC 1/SC 29/WG 11 15th Meeting: Gothenburg, SE, Jul. 3-12, 2019, pp. 1-461.

Debargha Mukherjee, et al., "A Switchable Loop-Restoration With Side-Information Framework for the Emerging AV1 Video Codec", ICIP 2017, IEEE, 2017, pp. 265-269.

Steinar Midtskogen, et al., "The AV1 Constrained Directional Enhancement Filter (CDEF)", Oct. 28, 2017, pp. 1-5.

International Search Report issued Apr. 30, 2021 in International Application No. PCT/US2021/016345.

Written Opinion of the International Searching Authority issued Apr. 30, 2021 in International Application No. PCT/US2021/016345.

European Patent Office, Supplementary European Search Report issued Sep. 8, 2022 by the European Patent Office.

Chen et al., "CE8 Subtest 2: Adaptation between Pixel-based Filter Selection", Joint Collaborative Team on Video Coding (JCT-VC), 5th Meeting: Geneva, CH, Mar. 16-23, 2011.

Chen et al., "CE8 Subtest 2: A Joint Proposal on Improving the adaptive Loop Filter in TMuC0.9 by MediaTek, Qualcomm, and Toshiba", Joint Collaborative Team on Video Coding (JCT-VC), 4th Meeting: Daegu, KR, Jan. 20-28, 2011.

Panusopone et al., "Flexible Picture Partitioning", Joint Collaborative Team on Video Coding (JCT-VC), 3rd Meeting: Guangzhou, CN, Oct. 7-15, 2010.

\* cited by examiner

LOOP FILTER BLOCK FLEXIBLE PARTITIONING

CROSS-REFERENCE TO RELATED APPLICATION

This application is a Continuation of U.S. application Ser. No. 17/067,054, filed Oct. 9, 2020, which claims priority from U.S. Provisional Application No. 62/984,096, filed on Mar. 2, 2020, the disclosure of which is incorporated herein by reference in its entirety.

FIELD

Embodiments of the present disclosure are directed to a set of advanced video coding technologies. More specifically, embodiments of the present disclosure may provide flexible picture partitioning for loop filter blocks.

BACKGROUND

AOMedia Video 1 (AV1) is an open video coding format designed for video transmissions over the Internet. It was developed as a successor to VP9 by the Alliance for Open Media (AOMedia), a consortium founded in 2015 that includes semiconductor firms, video on demand providers, video content producers, software development companies and web browser vendors. Many of the components of the AV1 project were sourced from previous research efforts by Alliance members. Individual contributors started experimental technology platforms years before: Xiph's/Mozilla's Daala published code in 2010, Google's experimental VP9 evolution project VP10 was announced on Sep. 12, 2014, and Cisco's Thor was published on Aug. 11, 2015. Building on the codebase of VP9, AV1 incorporates additional techniques, several of which were developed in these experimental formats. The first version, version 0.1.0 of the AV1 reference codec was published on Apr. 7, 2016. The Alliance announced the release of the AV1 bitstream specification on Mar. 28, 2018, along with a reference, software-based encoder and decoder. On Jun. 25, 2018, a validated version 1.0.0 of the specification was released. On Jan. 8, 2019 a validated version 1.0.0 with Errata 1 of the specification was released. The AV1 bitstream specification includes a reference video codec.

ITU-T VCEG (Q6/16) and ISO/IEC MPEG (JTC 1/SC 29/WG 11) published version 1 of the H.265/HEVC (High Efficiency Video Coding) standard in 2013, version 2 in 2014, version 3 in 2015, and version 4 in and 2016. In 2015, these two standard organizations jointly formed the JVET (Joint Video Exploration Team) to explore the potential of developing the next video coding standard beyond HEVC In October 2017, JVET issued the Joint Call for Proposals on Video Compression with Capability beyond HEVC (CfP). By Feb. 15, 2018, a total of 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/10th JVET meeting. As a result of this meeting, JVET formally launched the standardization process of next-generation video coding beyond HEVC. The new standard was named Versatile Video Coding (VVC), and JVET was renamed as the Joint Video Expert Team. The current version of VTM (VVC Test Model), is VTM 7.

SUMMARY

In loop filtering processes, a picture is partitioned into several equal size loop filtering blocks (except for those in last row/column), this may limit loop filtering performance.

Embodiments of the instant disclosure provide solutions to the above problem. For example, according to embodiments loop filtering blocks may be of different sizes, thereby improving loop filtering performance.

According to embodiments, there is provided a method of loop filtering in a video coding process performed by at least one processor, the method comprising: receiving image data; analyzing the image data; flexibility partitioning the image data into loop filtering blocks (LFBs); and applying a loop filter to the LFBs.

According to the embodiments, the flexible partitioning may be performed to allow the size of LFBs in at least one of a first row and a first column in a same frame to be smaller than other LFBs within the same frame.

According to the embodiments, the flexible partitioning may be performed to allow the size of LFBs in the first row to have a smaller height than LFBs disposed in the same frame, that are not disposed in at least one of the last row and last column in the same frame.

According to the embodiments, the flexible partitioning may be performed to allow the size of LFBs in the first column to have a smaller width than LFBs disposed in the same frame, that are not disposed in at least one of the last row and last column in the same frame.

According to the embodiments, the flexible partitioning may be performed to allow the size of LFBs in at least one of a first row and first column to be smaller than other LFBs within a same frame, and no partitioning remainder is included in a last row and last column within the same frame.

According to the embodiments, the height of LFBs in the first row and the width of LFBs in the first column may be hard-coded.

According to the embodiments, the method may further comprise providing an indication of whether at least one of LFBs in the first row and first column have smaller sizes than LFBs in other areas of the same frame.

According to the embodiments, separate syntaxes may be used to indicate the height of LFBs in the first row and the width of LFBs in the first column.

According to the embodiments, the height of LFBs in the first row may be identical to the width of LFBs in the first column.

According to the embodiments, there may be no partitioning remainder included in a last row and last column within the same frame.

DETAILED DESCRIPTION

Embodiments described herein provides methods and an apparatus for encoding and/or decoding image data.

[Adaptive Loop Filtering]

In VTM7, an Adaptive Loop Filter (ALF) with block-based filter adaption is applied. For the Luma component, one filter, from among 25 filters, is selected for each 4×4 block, based on the direction and activity of local gradients.

[Filter Shapes]

Figure 1:
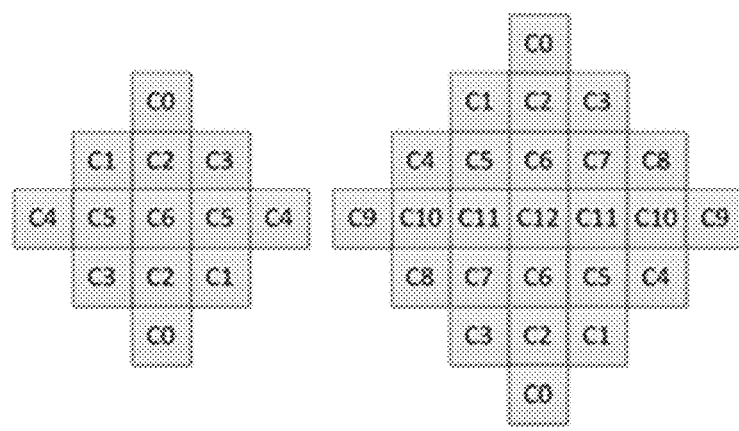
FIG. 1 is schematic illustration of adaptive loop filter (ALF) shapes.

In VTM7, and with reference to FIG. 1, two diamond-shaped filters are used. The 7×7 diamond shape is applied for Luma components and the 5×5 diamond shape is applied for Chroma components.

[Block Classification]

For Luma components, each 4×4 block is categorized into one class, out of 25 classes. The classification index C is derived based on its directionality D and a quantized value of activity $\hat{A}$. This illustrated in Equation 1 (below).

$$C = 5D + \hat{A} \qquad \text{Equation 1:}$$

To calculate D and $\hat{A}$, gradients of the horizontal, vertical and two diagonal direction are first calculated using 1-D Laplacian equations, illustrated in Equations 2-5 (below).

$$g_v = \Sigma_{k=i-2}^{i+3} \Sigma_{l=j-2}^{j+3} V_{k,l}, V_{k,l} = |2R(k,l) - R(k,l-1) - R(k,l+1)| \qquad \text{Equation 2:}$$

$$g_h = \Sigma_{k=i-2}^{i+3} \Sigma_{l=j-2}^{j+3} H_{k,l}, H_{k,l} = |2R(k,l) - R(k-1,l) - R(k+1,l)|(2-1) \qquad \text{Equation 3:}$$

$$g_{d1} = \Sigma_{k=i-2}^{i+3} \Sigma_{l=j-2}^{j+3} D1_{k,l}, D1_{k,l} = |2R(k,l) - R(k-1,l-1) - R(k+1,l+1)| \qquad \text{Equation 4:}$$

$$g_{d2} = \Sigma_{k=i-2}^{i+3} \Sigma_{l=j-2}^{j+3} D2_{k,l}, D2_{k,l} = |2R(k,l) - R(k-1,l+1) - R(k+1,l-1)| \qquad \text{Equation 5:}$$

Here, indices i and j refer to the coordinates of the upper left sample within the 4×4 block and R(i, j) indicate a reconstructed sample at coordinate (i, j).

Figure 2A:
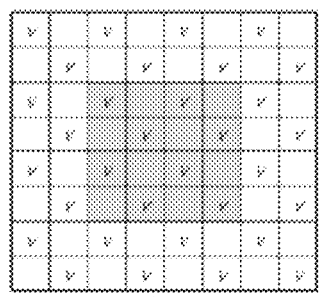
FIGS. 2A-2D are schematic illustrations of sub-sampled Lacplacian calculations.
Figure 2B:
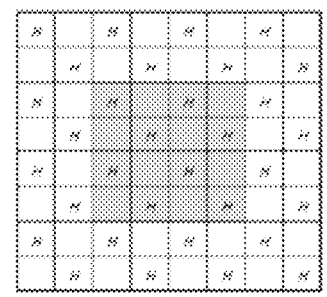
Figure 2C:
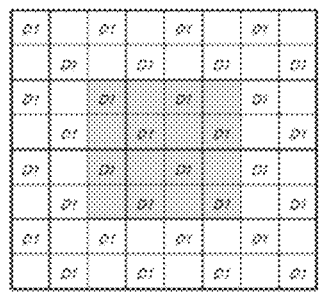
Figure 2D:
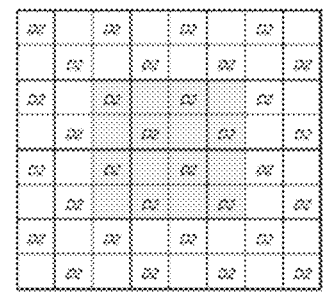

To reduce the complexity of block classifications, the subsampled 1-D Laplacian calculations are applied. As shown in FIG. 2, the same subsampled positions are used for gradient calculation of all directions. Here, FIG. 2A depicts subsampled positions for a vertical gradient. FIG. 2B depicts subsampled positions for a horizontal gradient. FIGS. 2C and 2D depict subsampled positions for diagonal gradients.

Then D maximum and minimum values of the gradients of horizontal and vertical directions are set according to Equation 6 (below):

$$g_{h,v}^{max} = \max(g_h, g_v), g_{h,v}^{min} = \min(g_h, g_v)$$

The maximum and minimum values of the gradient of two diagonal directions are set as according to Equation 7 (below):

$$g_{d0,d1}^{max} = \max(g_{d0}, g_{d1}), g_{d0,d1}^{min} = \min(g_{d0}, g_{d1})$$

To derive the value of the directionality D, these values are compared against each other and with two thresholds $t_1$ and $t_2$:

Step 1. If both $g_{h,v}^{max} \le t_1 \cdot g_{d0,d1}^{min}$ and $g_{d0,d1}^{min} \le t_1 \cdot g_{d0,d1}^{min}$ are true, D is set to 0.

Step 2. If $g_{h,v}^{max}/g_{h,v}^{min} > g_{d0,d1}^{max}/g_{d0,d1}^{min}$ continue from Step 3; otherwise continue from Step 4.

Step 3. If $g_{h,v}^{max} > t_2 \cdot g_{h,v}^{min}$; D is set to 2; otherwise D is set to 1.

Step 4. If $g_{d0,d1}^{max} > t_2 \cdot g_{d0,d1}^{min}$, D is set to 4; otherwise D is set to 3.

The activity value A is calculated according to Equation 8 (below):

$$A = \Sigma_{k=i-2}^{i+3} \Sigma_{l=j-2}^{j+3} (V_{k,l} + H_{k,l})$$

A is further quantized in the range of 0 to 4, inclusive, and the quantized value is denoted as $\hat{A}$.

For Chroma components in a picture, no classification method is applied, i.e. a single set of ALF coefficients is applied for each Chroma component.

[Geometric Transformations of Filter Coefficients and Clipping Vales]

Before filtering each 4×4 Luma block, geometric transformations such as rotation, diagonal, and/or vertical flipping is/are applied to the filter coefficients f(k,l) and to the corresponding filter clipping values c(k,l) depending on gradient values calculated for that block. This is equivalent to applying these transformations to the samples in the filter support region. The idea is to make different blocks to which ALF is applied more similar by aligning their directionality.

Three geometric transformations, including diagonal, vertical flip and rotation are introduced: in the below equations 9-11.

Diagonal: $f_D(k,l)=f(l,k), c_D(k,l)=c(l,k)$     Equation 9:

Vertical flip: $f_D(k,l)=f(k,K-l-1), c_V(k,l)=c(k,K-l-1)$     Equation 10:

Rotation: $f_R(k,l)=f(K-l-1,k), c_R(k,l)=c(K-l-1,k)$     Equation 11:

Here, K is the size of the filter, and 0≤k, l≤K−1 are coefficients coordinates, such that the location (0,0) is at the upper left corner and the location (K−1, K−1) is at the lower right corner. The transformations are applied to the filter coefficients f (k, l) and to the clipping values c(k, l) depending on gradient values calculated for that block. The relationship between the transformation and the four gradients of the four directions are summarized in the following table.

TABLE 1

Mapping of the gradient calculated for one block and the respective transformations.

| Gradient values | Transformation |
| --- | --- |
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

[Filter Parameters Signalling]

In VTM7, ALF filter parameters are signalled in APS. In one APS, up to 25 sets of Luma filter coefficients and clipping value indexes, and up to eight sets of Chroma filter coefficients and clipping value indexes can be signalled. To reduce bits overhead, filter coefficients of different classifications for Luma component can be merged. In slice headers, the indices of the APSs used for the current slice may be signaled. The signaling of ALF is CTU based in VTM7.

Clipping value indexes, which are decoded from the APS, allow determining clipping values using a table of clipping values for Luma and Chroma components. These clipping values are dependent on the internal bitdepth. More precisely, the table of clipping values is obtained by the following formula:

$\text{AlfClip}=\{\text{round}(2^{B-\alpha*n}) \text{ for } n\in[0 \ldots N-1]\}$     Equation 12:

Here, B is equal to the internal bitdepth, a is a pre-defined constant value equal to 2.35, and N is equal to 4, which is the number of allowed clipping values in VVC. Table 2 shows the output of Equation 12:

TABLE 2

Specification AlfClip depending on bitDepth and clipIdx

| | clipIdx | | | |
| --- | --- | --- | --- | --- |
| bitDepth | 0 | 1 | 2 | 3 |
| 8 | 255 | 50 | 10 | 2 |
| 9 | 511 | 100 | 20 | 4 |
| 10 | 1023 | 201 | 39 | 8 |
| 11 | 2047 | 402 | 79 | 15 |
| 12 | 4095 | 803 | 158 | 31 |
| 13 | 8191 | 1607 | 315 | 62 |
| 14 | 16383 | 3214 | 630 | 124 |
| 15 | 32767 | 6427 | 1261 | 247 |
| 16 | 65535 | 12855 | 2521 | 495 |

In the slice header, up to 7 APS indices can be signaled to specify the Luma filter sets that are used for the current slice. The filtering process can be further controlled at the CTB level. A flag is always signalled to indicate whether ALF is applied to a Luma CTB. A Luma CTB can choose a filter set from among 16 fixed filter sets and the filter sets from APSs. A filter set index is signaled for a Luma CTB to indicate which filter set is to be applied. The 16 fixed filter sets are pre-defined and hard-coded in both the encoder and the decoder.

For Chroma components, an APS index is signaled in the slice header to indicate that the Chroma filter sets are being used for the current slice. At the CTB level, a filter index is signaled for each Chroma CTB if there is more than one Chroma filter set in the APS.

The filter coefficients are quantized with a norm equal to 128. In order to restrict the multiplication complexity, a bitstream conformance is applied so that the coefficient value of the non-central position is in the range of −2⁷ to 2⁷−1, inclusive. The central position coefficient is not signalled in the bitstream and is considered as equal to 128.

In VVC Draft 7, the syntaxes and semantics of clipping index and values are defined as follows:

alf_Luma_clip_idx[sfIdx][j] specifies the clipping index of the clipping value to use before multiplying by the j-th coefficient of the signalled Luma filter indicated by sfIdx. It is a requirement of bitstream conformance that the values of alf_Luma_clip_idx[sfIdx][j] with sfIdx=0 . . . alf_Luma_num_filters_signalled_minus1 and j=0 . . . 11 be in the range of 0 to 3, inclusive.

The Luma filter clipping values AlfClipL[adaptation_parameter_set_id] with elements AlfClipL[adaptation_parameter_set_id][filtIdx][j], with filtIdx=0 . . . NumAlfFilters− 1 and j=0 . . . 11 are derived as specified in Table 2 depending on bitDepth set being equal to BitDepthY and clipIdx set being equal to alf_Luma_clip_idx[alf_Luma_coeff_delta_idx[filtIdx] ][j].

alf_Chroma_clip_idx[altIdx][j] specifies the clipping index of the clipping value to use before multiplying by the j-th coefficient of the alternative Chroma filter with index the altIdx. It is a requirement of bitstream conformance that the values of alf_Chroma_clip_idx[altIdx][j] with altIdx=0 . . . alf_Chroma_num_alt_filters_minus1, j=0 . . . 5 be in the range of 0 to 3, inclusive.

The Chroma filter clipping values AlfClipC[adaptation_parameter_set_id][altIdx] with elements AlfClipC[adaptation_parameter_set_id][altIdx][j], with altIdx=0 . . . alf_Chroma_num_alt_filters_minus1, j=0 . . . 5 are derived as specified in Table 2 depending on bitDepth being set equal to BitDepthC and clipIdx being set equal to alf_Chroma_clip_idx[altIdx][j].

[Filtering Process]

At a decoder side, when ALF is enabled for a CTB, each sample R(i, j) within the CU is filtered, resulting in sample value R'(i, j) as shown below in Equation 13:

$R'(i,j)=R(i,j)+((\Sigma_{k\neq 0}\Sigma_{l\neq 0}f(k,l)\times K(R(i+k,j+l)-R(i,j),c(k,l))+64)>>7)$ Here, f(k,l) denotes the decoded filter coefficients, K(x, y) is the clipping function and c(k,l) denotes the decoded clipping parameters. The variable k and l vary between $$-\frac{L}{2} \text{ and } \frac{L}{2}$$

where L denotes the filter length. The clipping function K(x, y)=min(y, max(−y, x)) which corresponds to the function Clip3 (−y, y, x). By incorporating this clipping function, as first proposed in JVET-N0242, this loop filtering method becomes a non-linear process, as known as Non-Linear ALF. The selected clipping values are coded in the "alf data"

syntax element by using a Golomb encoding scheme corresponding to the index of the clipping value in Table 2. This encoding scheme is the same as the encoding scheme for the filter index.

[Virtual Boundary Filtering Process for Line Buffer Reproduction]

Figure 3:
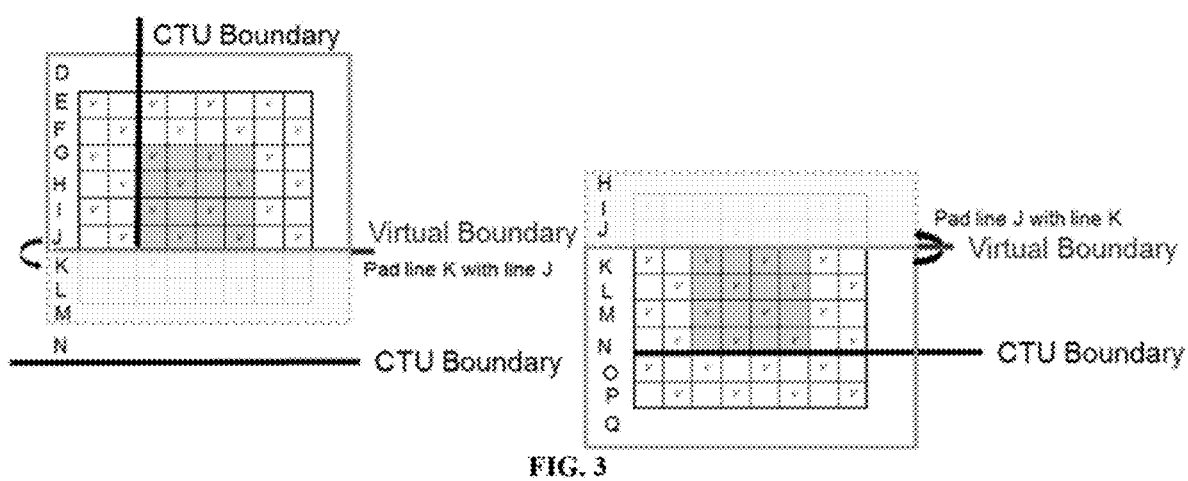
FIG. 3 is a schematic illustration of a modified block classification applied for a Luma component.
Figure 4A:
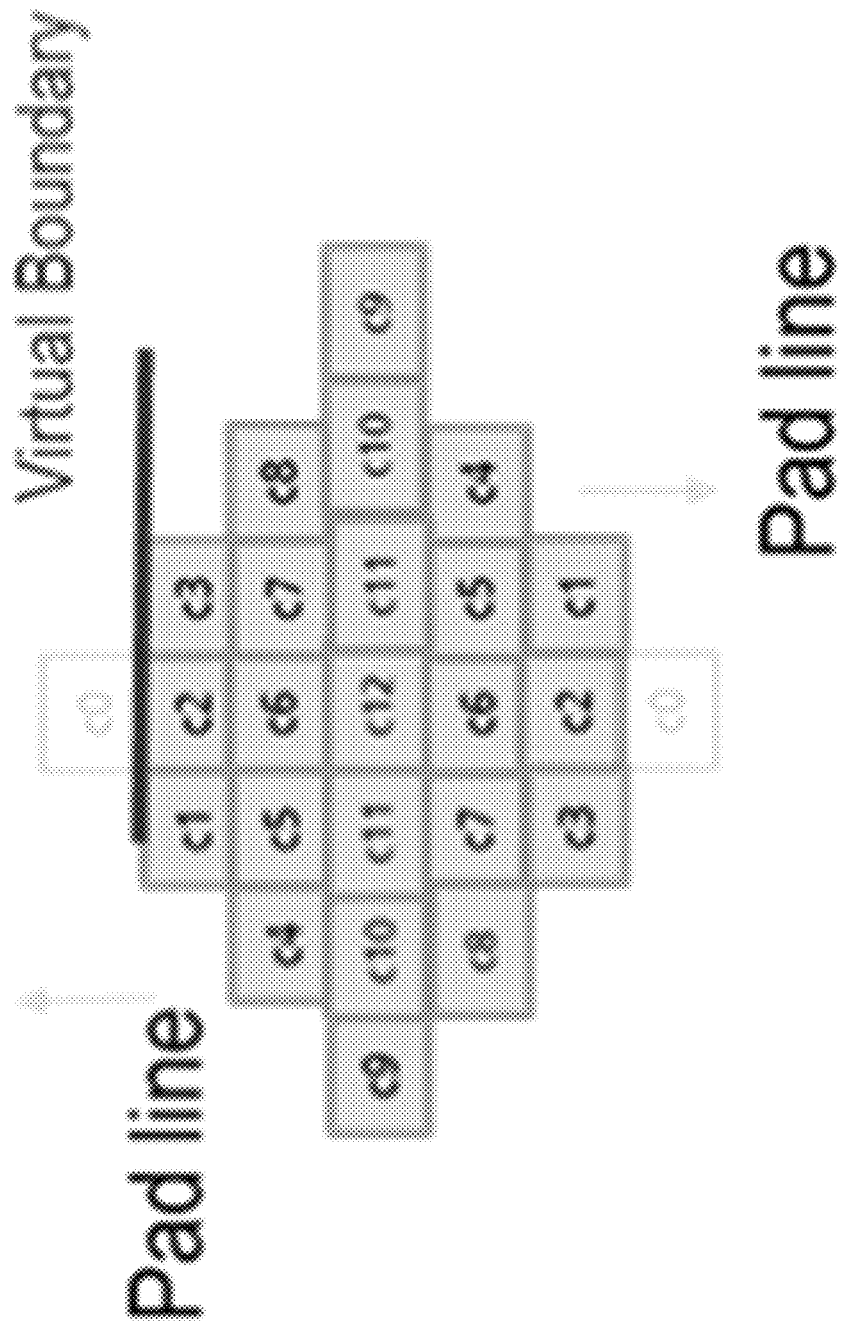
FIG. 4A is a schematic illustration of modified of applied adaptive loop filtering (ALF) for Luna component(s) at virtual boundaries.
Figure 4B:
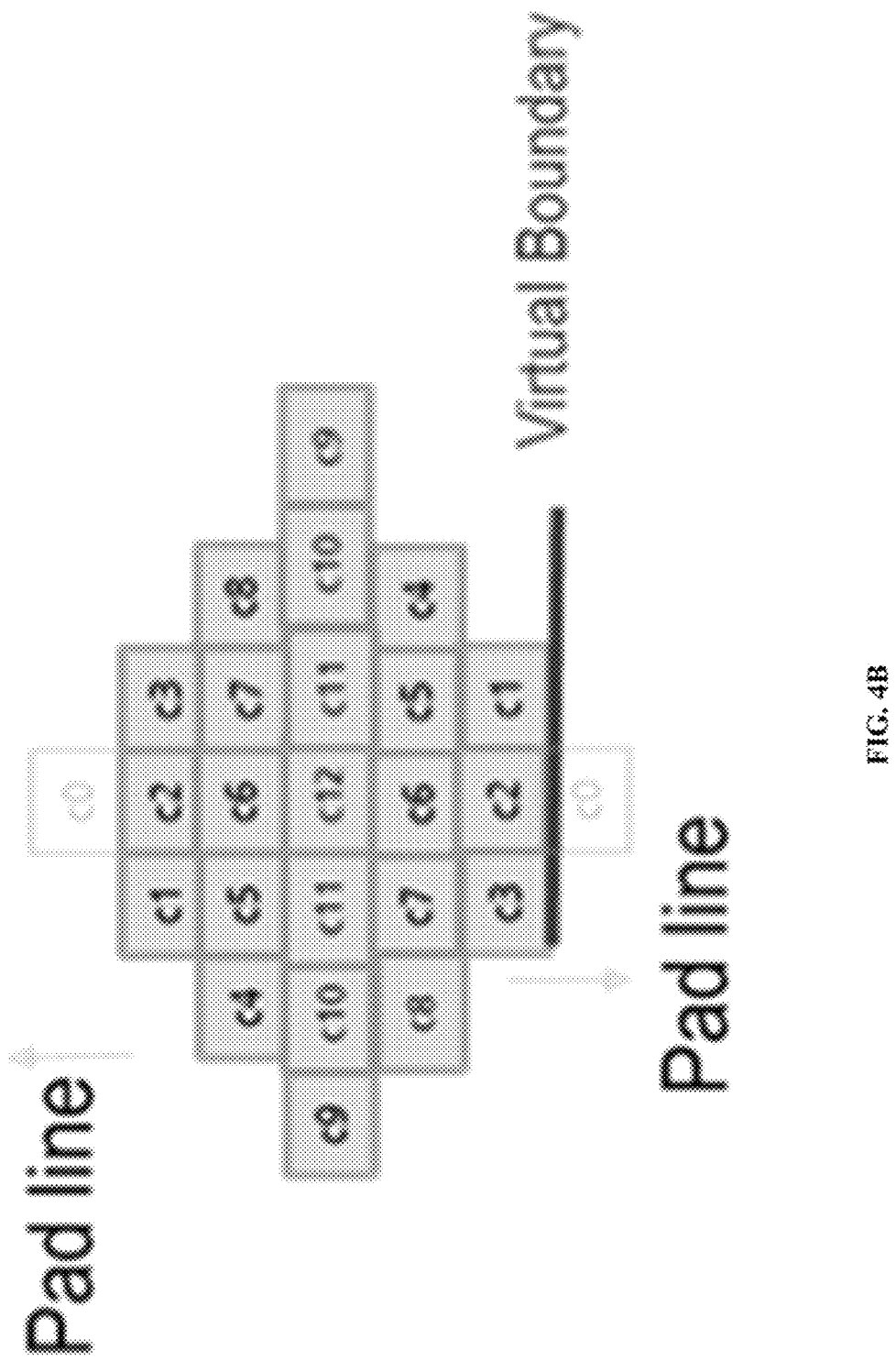
FIG. 4B is a schematic illustration of modified applied adaptive loop filtering (ALF) for Luna component(s) at virtual boundaries.
Figure 4C:
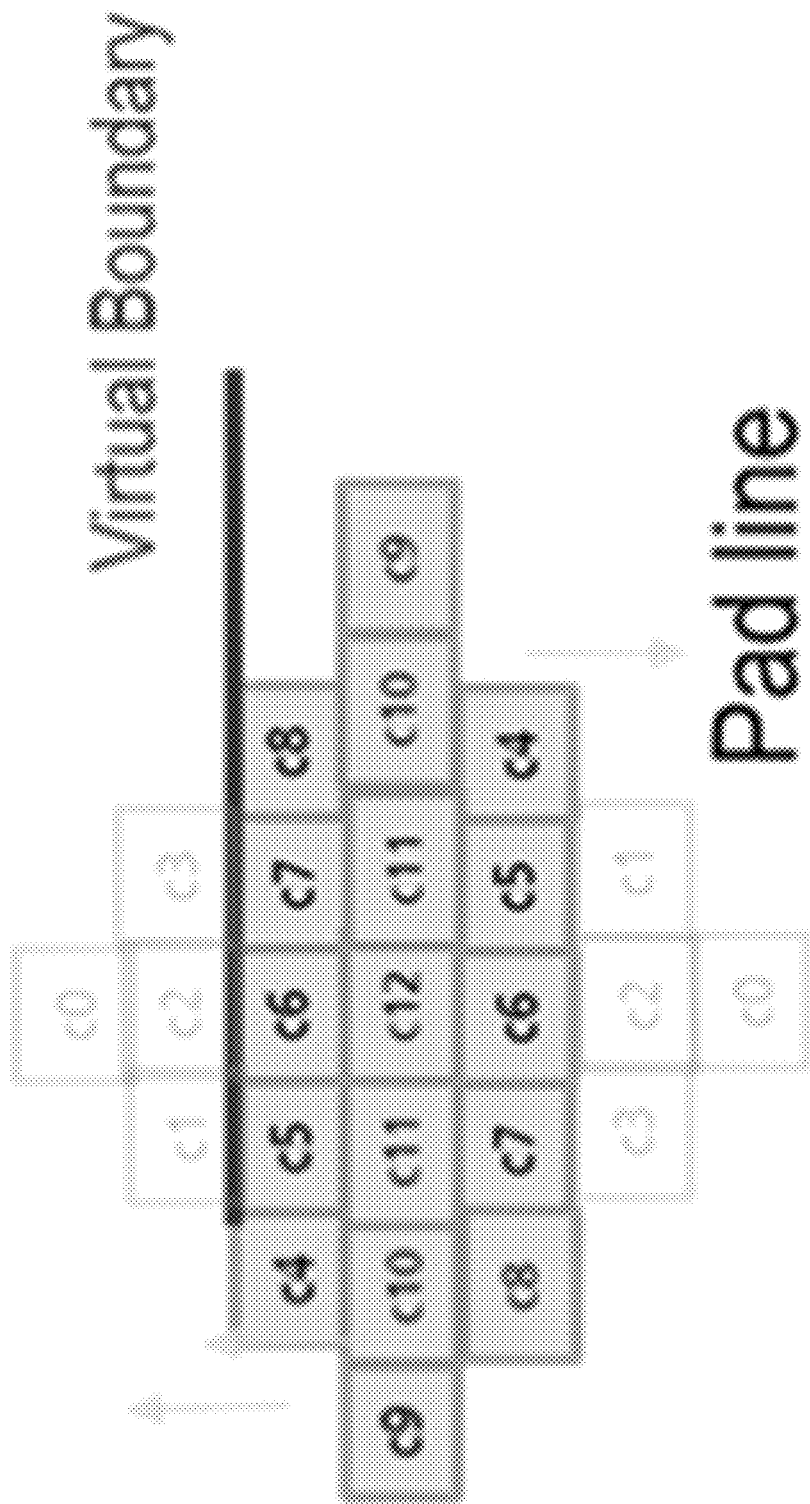
FIG. 4C is a schematic illustration of modified applied adaptive loop filtering (ALF) for Luna component(s) at virtual boundaries.
Figure 4D:
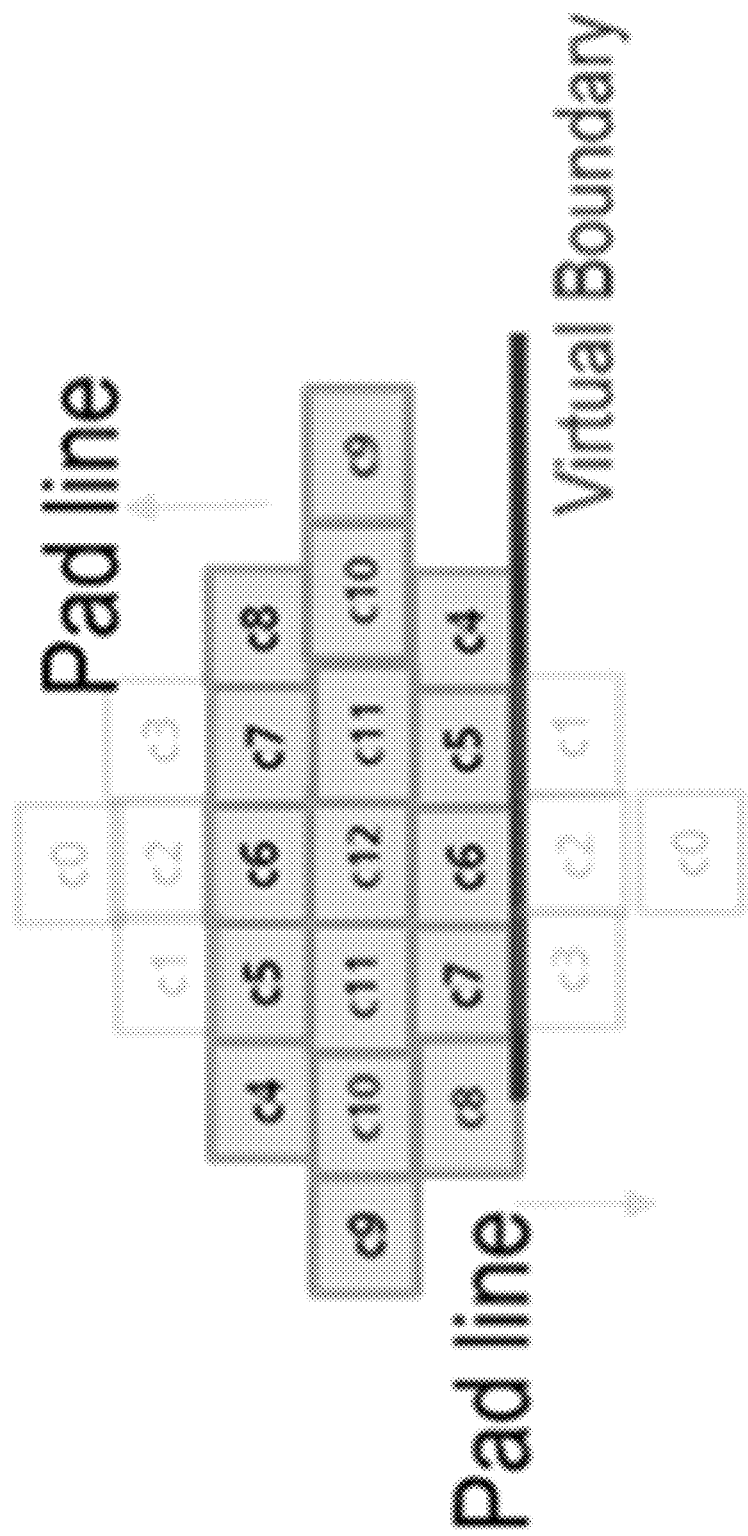
FIG. 4D is a schematic illustration of modified applied adaptive loop filtering (ALF) for Luna component(s) at virtual boundaries.
Figure 4E:
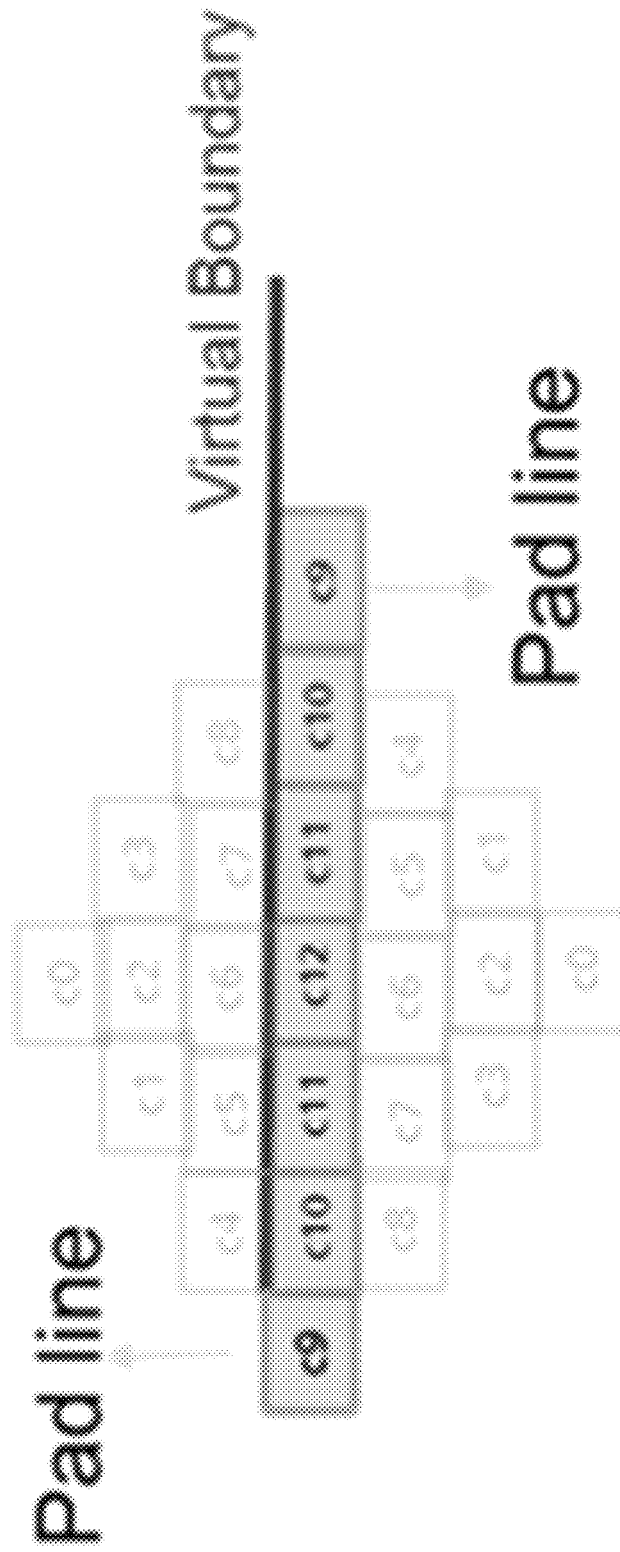
FIG. 4E is a schematic illustration of modified applied adaptive loop filtering (ALF) for Luna component(s) at virtual boundaries.
Figure 4F:
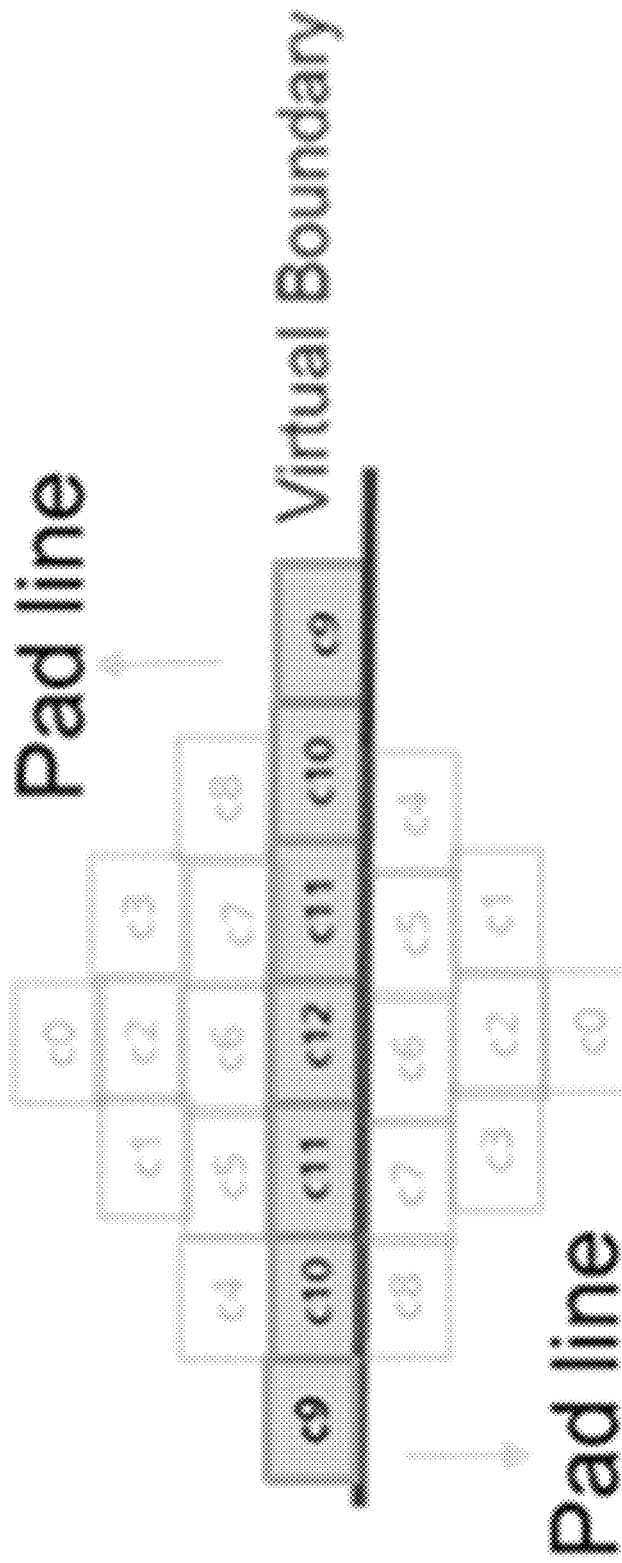
FIG. 4F is a schematic illustration of modified applied adaptive loop filtering (ALF) for Luna component(s) at virtual boundaries.

In VTM7, to reduce the line buffer requirement of ALF, modified block classification and filtering are employed for the samples near horizontal CTU boundaries. For this purpose, a virtual boundary is defined as a line by shifting the horizontal CTU boundary with "N" samples as shown in FIG. 3. In FIG. 3, N is equal to 4 for the Luma component and 2 for the Chroma component.

As illustrated in FIG. 3, a modified block classification is applied for the Luma component. For the 1D Laplacian gradient calculation of the 4×4 block, in the virtual boundary, only the samples above the virtual boundary are used. Similarly, for the 1D Laplacian gradient calculation of the 4×4 block below the virtual boundary, only the samples below the virtual boundary are used. The quantization of the activity value A is accordingly scaled by taking into account the reduced number of samples used in 1D Laplacian gradient calculation.

For filtering processing, symmetric padding operation at the virtual boundaries are used for both Luma and Chroma components. As shown in FIG. 4, when the sample being filtered is located below the virtual boundary, the neighboring samples that are located above the virtual boundary are padded. Meanwhile, the corresponding samples at the other sides are also padded, symmetrically.

[LCU-Aligned Picture Quadtree Splitting]

In order to enhance coding efficiency, the coding unit synchronous picture quadtree-based adaptive loop filter is proposed in JCTVC-C143. Here, the Luma picture is split into several multi-level quadtree partitions, and each partition boundary is aligned to the boundaries of the largest coding units (LCUs). Each partition has its own filtering process and thus may be referred to as a filter unit (FU).

2-pass encoding flow is described as follows. At the first pass, the quadtree split pattern and the best filter of each FU are decided. The filtering distortions are estimated by FFDE during the decision process. According to the decided quadtree split pattern and the selected filters of all FUs, the reconstructed picture is filtered. At the second pass, the CU synchronous ALF on/off control is performed. According to the ALF on/off results, the first filtered picture is partially recovered by the reconstructed picture.

Figure 5:
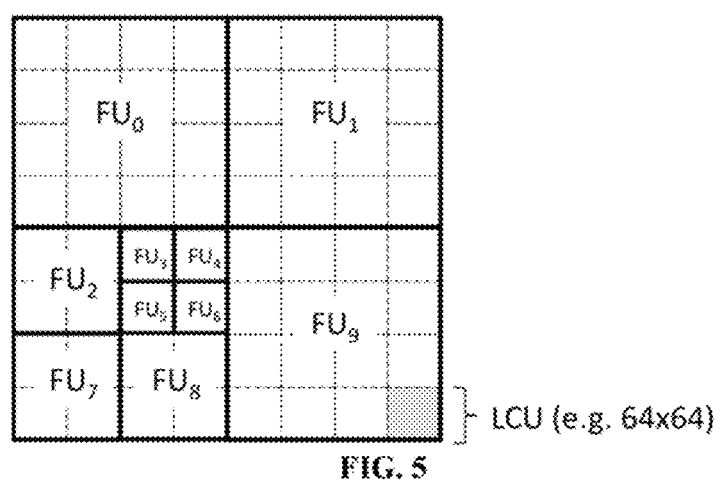
FIG. 5 is a schematic illustration of LCU-aligned picture quadtree splitting.

A top-down splitting strategy is adopted to divide a picture into multi-level quadtree partitions by using a rate-distortion criterion. Each partition is called a filter unit. The splitting process aligns quadtree partitions with LCU boundaries. The encoding order of FUs follows the z-scan order. For example, as shown in FIG. 5, the picture is split into 10 FUs, and the encoding order is FU0, FU1, FU2, FU3, FU4, FU5, FU6, FU7, FU8, and FU9.

Figure 6:
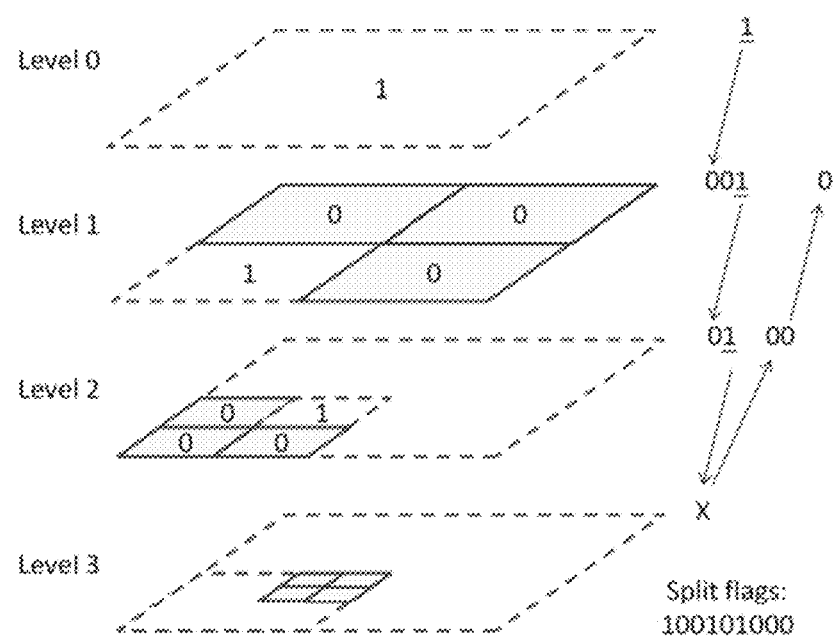
FIG. 6 is a schematic illustration of quadtree split flags encoded at a zth order.

To indicate the picture quadtree split pattern, split flags are encoded and transmitted in a z-order. FIG. 6 shows the quadtree split pattern in correspondence with FIG. 5.

The filter of each FU is selected from two filter sets based on the rate-distortion criterion. The first set has 1/2-symmetric square-shaped and rhombus-shaped filters newly derived for the current FU. The second set comes from time-delayed filter buffers; the time-delayed filter buffers store the filters previously derived for FUs of prior pictures. The filter with the minimum rate-distortion cost of these two sets is chosen for the current FU. Similarly, if the current FU is not the smallest FU and can be further split into 4 children FUs, the rate-distortion costs of the 4 Children FUs are calculated. By comparing the rate-distortion cost of the split and non-split cases recursively, the picture quadtree split pattern can be decided.

The maximum quadtree split level is 2 in JCTVC-C143, which means the maximum number of FUs is 16. During the quadtree split decision, the correlation values for deriving Wiener coefficients of the 16 FUs at the bottom quadtree level (smallest FUs) can be reused. The rest of the FUs can derive their Wiener filters from the correlations of the 16 FUs at the bottom quadtree level. Therefore, there is only one frame buffer access for deriving the filter coefficients of all FUs.

After the quadtree split pattern is decided, to further reduce the filtering distortion, the CU synchronous ALF on/off control is performed. By comparing the filtering distortion and non-filtering distortion, the leaf CU can explicitly switch ALF on/off in its local region. The coding efficiency may be further improved by redesigning the filter coefficients according to the ALF on/off results. However, the redesigning process needs additional frame buffer accesses. In the proposed CS-PQALF encoder design, there is no redesign process after the CU synchronous ALF on/off decision in order to minimize the number of frame buffer accesses.

[Cross-Component Adaptive Loop Filter]

Figure 7A:
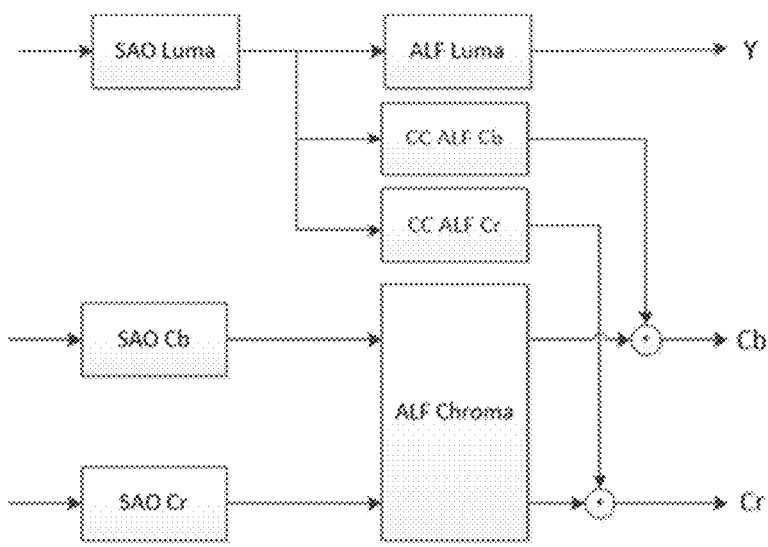
FIGS. 7A and 7B depict schematic illustrations of placement of CC ALF

In JVET-O0636, cross-component adaptive loop filter (CC-ALF) was proposed. CC-ALF makes use of Luma sample values to refine each Chroma component. FIG. 7A illustrates the placement of CC-ALF with respect to the other loop filters.

Figure 7B:
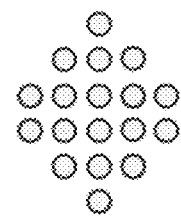

CC-ALF operates by applying a linear, diamond shaped filter (FIG. 7B) to the Luma channel for each Chroma component. The filter coefficients are transmitted in the APS, scaled by a factor of $2^{10}$, and rounded for fixed point representation. The application of the filters is controlled on a variable block size and signalled by a context-coded flag received for each block of samples. The block size along with an CC-ALF enabling flag is received at the slice-level for each Chroma component. In the contribution the following block sizes (in Chroma samples) were supported 16×16, 32×32, 64×64.

The syntax changes of CC-ALF as proposed in JVET-P1008 are described below.

TABLE 3

Syntax Changes of CC-ALF as Proposed in JVET-P1008

```
if ( slice_cross_component_alf_cb_enabled_flag )
    alf_ctb_cross_component_cb_idc[ xCtb >> CtbLog2SizeY ][ yCtb >> CtbLog2SizeY ]              ae(v)
    if( slice_cross_component_alf_cb_enabled_flag = = 0 || alf_ctb_cross_component_cb_idc[ x
Ctb >> CtbLog2SizeY ][ yCtb >> CtbLog2SizeY ] == 0 )
    if( slice_alf_Chroma_idc = = 1 || slice_alf_Chroma_idc = = 3 ) {
        alf_ctb_flag[ 1 ][ xCtb >> CtbLog2SizeY ][ yCtb >> CtbLog2SizeY ]                       ae(v)
        if( alf_ctb_flag[ 1 ][ xCtb >> CtbLog2SizeY ][ yCtb >> CtbLog2SizeY ]
            && aps_alf_Chroma_num_alt_filters_minus1 > 0 )
```

TABLE 3-continued

Syntax Changes of CC-ALF as Proposed in JVET-P1008

```
        alf_ctb_filter_alt_idx[ 0 ][ xCtb >> CtbLog2SizeY ][ yCtb >> CtbLog2SizeY ]              ae(v)
    }
    if ( slice_cross_component_alf_cr_enabled_flag )
        alf_ctb_cross_component_cr_idc[ xCtb >> CtbLog2SizeY ][ yCtb >> CtbLog2SizeY ]           ae(v)
    if( slice_cross_component_alf_cr_enabled_flag = = 0 || alf_ctb_cross_component_cr_idc[ xC
tb >> CtbLog2SizeY ][ yCtb >> CtbLog2SizeY ] == 0 )
    if( slice_alf_Chroma_idc = = 2 | | slice_alf_Chroma_idc = = 3 ) {
        alf_ctb_flag[ 2 ][ xCtb >> CtbLog2SizeY ][ yCtb >> CtbLog2SizeY ]                        ae(v)
        if( alf_ctb_flag[ 2 ][ xCtb >> CtbLog2SizeY ][ yCtb >> CtbLog2SizeY ]
            && aps_alf_Chroma_num_alt_filters_minus1 > 0 )
            alf_ctb_filter_alt_idx[ 1 ][ xCtb >> CtbLog2SizeY ][ yCtb >> CtbLog2SizeY ]          ae(v)
    }
```

The semantics of CC-ALF related syntaxes are described below:

When alf_ctb_cross_component_cb_idc [xCtb>>CtbLog2SizeY][yCtb>>CtbLog2SizeY] is equal to 0, this indicates that the cross component Cb filter is not applied to block of Cb colour component samples at Luma location (xCtb, yCtb). When alf_cross_component_cb_idc [xCtb>>CtbLog2SizeY][yCtb>>CtbLog2SizeY] is not equal to 0, this indicates that the alf_cross_component_cb_idc[xCtb>>CtbLog2SizeY][yCtb>>CtbLog2SizeY]-th cross component Cb filter is applied to the block of Cb colour component samples at Luma location (xCtb, yCtb)

When alf_ctb_cross_component_cr_idc [xCtb>>CtbLog2SizeY][yCtb>>CtbLog2SizeY] is equal to 0, this indicates that the cross component Cr filter is not applied to block of Cr colour component samples at Luma location (xCtb, yCtb). When alf_cross_component_cr_idc [xCtb>>CtbLog2SizeY][yCtb>>CtbLog2SizeY] is not equal to 0, this indicates that the alf_cross_component_cr_idc[xCtb>>CtbLog2SizeY][yCtb>>CtbLog2SizeY]-th cross component Cr filter is applied to the block of Cr colour component samples at Luma location (xCtb, yCtb)

[Location of Chroma Samples]

Figure 8:
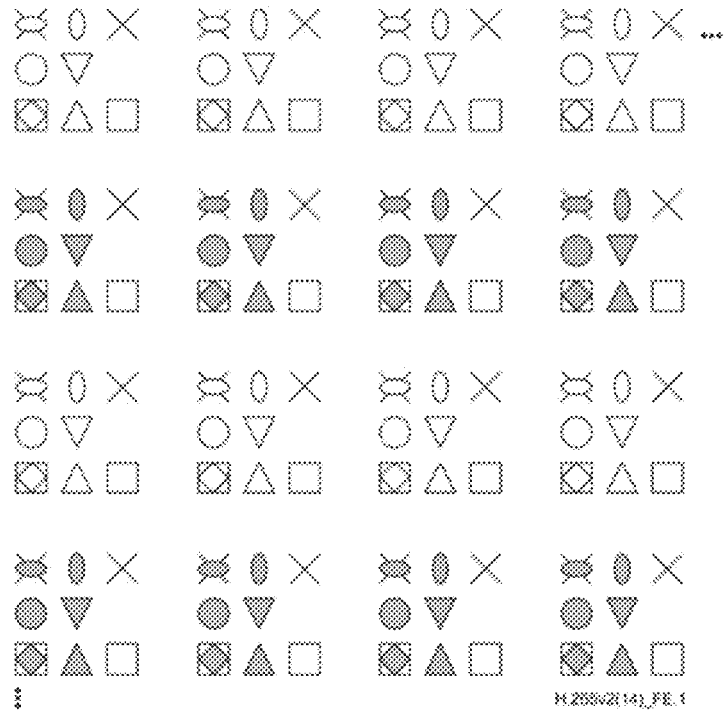
FIG. 8 is a schematic illustration of the location of Chroma samples relative to Luma samples.

FIG. 8 illustrates the indicated relative position of the top-left Chroma sample when Chroma_format_idc is equal to 1 (4:2:0 Chroma format), and Chroma_sample_loc_type_top_field or Chroma_sample_loc_type_bottom_field is equal to the value of a variable ChromaLocType. The region represented by the top-left 4:2:0 Chroma sample (depicted as a large red square with a large red dot at its centre) is shown relative to the region represented by the top-left Luma sample (depicted as a small black square with a small black dot at its centre). The regions represented by neighbouring Luma samples are depicted as small grey squares with small grey dots at their centres. As an explanation of symbols, the "X" represents a Luma sample top filed; the Square represents a Luma sample bottom filed. And the ellipse, triangle, and rhombus shapes represent Chroma sample types.

[Constrained Directional Enhancement Filter]

The main goal of the in-loop constrained directional enhancement filter (CDEF) is to filter out coding artifacts while retaining details of the image. In HEVC, the Sample Adaptive Offset (SAO) algorithm achieves a similar goal by defining signal offsets for different classes of pixels. Unlike SAO, CDEF is a non-linear spatial filter. The design of the filter has been constrained to be easily vectorizable (i.e. implementable with SIMD operations), which was not the case for other non-linear filters like the median filter and the bilateral filter.

The CDEF design originates from the following observations. The amount of ringing artifacts in a coded image tends to be roughly proportional to the quantization step size. The amount of detail is a property of the input image, but the smallest detail retained in the quantized image tends to also be proportional to the quantization step size. For a given quantization step size, the amplitude of the ringing is generally less than the amplitude of the details.

CDEF works by identifying the direction of each block and then adaptively filtering along the identified direction and to a lesser degree along directions rotated 45 degrees from the identified direction. The filter strengths are signaled explicitly, which allows a high degree of control over the blurring. An efficient encoder search is designed for the filter strengths. CDEF is based on two previously proposed in-loop filters and the combined filter was adopted for the emerging AV1 codec.

[Direction Search]

Figure 9:
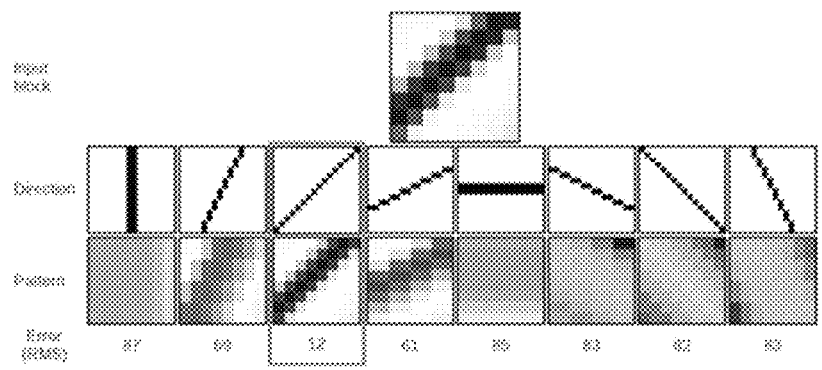
FIG. 9 is a schematic illustration of a directional search for an 8×8 block.

The direction search operates on the reconstructed pixels, just after the deblocking filter. Since those pixels are available to the decoder, the directions require no signaling. The search operates on 8×8 blocks, which are small enough to adequately handle non-straight edges, while being large enough to reliably estimate directions when applied to a quantized image. Having a constant direction over an 8×8 region also makes vectorization of the filter easier. For each block we determine the direction that best matches the pattern in the block by minimizing the sum of squared differences (SSD) between the quantized block and the closest perfectly directional block. A perfectly directional block is a block where all of the pixels along a line in one direction have the same value. FIG. 9 presents an example of direction search for an 8×8 block.

[Non-Linear Low-Pass Directional Filer]

The main reason for identifying the direction is to align the filter taps along that direction to reduce ringing while preserving the directional edges or patterns. However, directional filtering alone sometimes cannot sufficiently reduce ringing. It is also desirable to use filter taps on pixels that do not lie along the main direction. To reduce the risk of blurring, these extra taps are treated more conservatively. For this reason, CDEF defines primary taps and secondary taps. The complete 2-D CDEF filter is expressed in the following Equation 14:

$$y(i, j) = x(i, j) + \text{round}\left(\sum_{m,n} w_{d,m,n}^{(p)} f(x(m, n) - x(i, j), S^{(p)}, D) + \sum_{m,n} w_{d,m,n}^{(s)} f(x(m, n) - x(i, j), S^{(s)}, D)\right),$$

Here, D is the damping parameter, $S^{(p)}$ and $S^{(s)}$ are the strengths of the primary and secondary taps, respectively, and round(·) rounds ties away from zero, $w_k$ are the filter weights and f(d, S, D) is a constraint function operating on the difference between the filtered pixel and each of the neighboring pixels. For small differences, f(d, S, D)=d, makes the filter behave like a linear filter. When the difference is large, f(d, S, D)=0, which effectively ignores the filter tap.

[Loop Restoration in AV1]

A set of in-loop restoration schemes are proposed for use in video coding post deblocking, to generally denoise and enhance the quality of edges, beyond the traditional deblocking operation. These schemes are switchable within a frame per suitably sized tile. The specific schemes described are based on separable symmetric Wiener filters, dual self-guided filters with subspace projection, and domain transform recursive filters. Because content statistics can vary substantially within a frame, these tools are integrated within a switchable framework where different tools can be triggered in different regions of the frame.

[Separable Symmetric Weiner Filer]

One restoration tool that has been shown to be promising is the Wiener filter. Every pixel in a degraded frame could be reconstructed as a non-causal filtered version of the pixels within a w×w window, around it where w=2r+1 is odd for integer r. If the 2D filter taps are denoted by a $w^2 \times 1$ element vector F in column-vectorized form, a straightforward LMMSE optimization leads to filter parameters being given by $F = H^{-1} M$, where $H = E[XX^T]$ is the autocovariance of x, the column-vectorized version of the $w^2$ samples in the w×w window around a pixel, and $M = E[YX^T]$ is the cross correlation of x with the scalar source sample y, to be estimated. The encoder can estimate H and M from realizations in the deblocked frame and the source and send the resultant filter F to the decoder. However, that would not only incur a substantial bit rate cost in transmitting $w^2$ taps, but also non-separable filtering will make decoding prohibitively complex. Therefore, several additional constraints are imposed on the nature of F. First, F is constrained to be separable so that the filtering can be implemented as separable horizontal and vertical w-tap convolutions. Second, each of the horizontal and vertical filters are constrained to be symmetric. Third, the sum of both the horizontal and vertical filter coefficients is assumed to sum to 1.

[Dual Self-Guided Filtering With Subspace Projection]

Guided filtering is one of the more recent paradigms of image filtering where a local linear model is used. An example is shown in Equation 15:

$$y = Fx + G$$

Here, the linear model is used to compute the filtered output y from an unfiltered sample x, where F and G are determined based on the statistics of the degraded image and a guidance image in the neighborhood of the filtered pixel. If the guide image is the same as the degraded image, the resultant so-called self-guided filtering has the effect of edge preserving smoothing. The specific form of self-guided filtering we propose depends on two parameters: a radius r and a noise parameter e, and is enumerated as follows:

Obtain mean μ and variance σ2 of pixels in a (2r+1)× (2r+1) window around every pixel. This can be implemented efficiently with box filtering based on integral imaging.

Compute for every pixel: $f = \sigma^2/(\sigma^2 + e)$; $g = (1-f)\mu$

Compute F and G for every pixel as averages off and g values in a 3×3 window around the pixel for use.

Filtering is controlled by r and e, where a higher r implies a higher spatial variance and a higher e implies a higher range variance.

Figure 10:
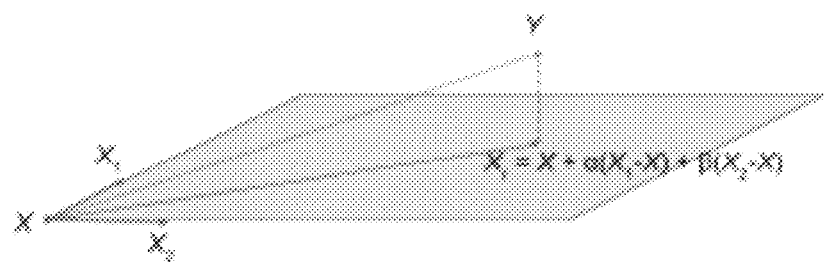
FIG. 10 is a schematic illustration of a sub-space projection.

The principle of subspace projection is illustrated diagrammatically in FIG. 10. Even though none of the cheap restorations $X_1$, $X_2$ are close to the source Y, appropriate multipliers {α, β} can bring them much closer to the source as long as they are moving somewhat in the right direction.

[Domain Transform Recursive Filers]

Domain Transforms are a recent approach to edge-preserving image filtering using only 1-D operations, that can potentially be much faster than other edge-aware processing approaches. The recursive filtering incarnation is used where the processing steps include horizontal left-to-right and right-to-left recursive order-1 filtering, followed by vertical top-to-bottom and bottom-to-top filtering, conducted over a few (typically 3) iterations. The filter taps are obtained from local horizontal and vertical gradients of the pixels and the iteration index.

[Joint Component Filering (JCF)]

A joint-component filtering (JCF) method is proposed in a previous IDF P20US056 which uses reconstruction samples from multiple color components as input, and the output is applied on multiple color components.

Loop filtering includes, but is not limited to ALF, SAO, Deblocking, CDEF, CCALF, LR and JCF. A loop filtering block (LFB) refers to the unit on which loop filtering processes are applied. The LFBs can be blocks from a picture level quadtree split (e.g., as discussed in above), or CTUs, or smaller blocks such as 4×4 or 8×8.

Embodiments disclosed herein be used separately or combined in any order. Further, each of the embodiments (e.g., encoder and/or decoder) may be implemented by processing circuitry (e.g., one or more processors or one or more integrated circuits). For example, the one or more processors can execute a program that is stored in a non-transitory computer-readable medium.

Certain embodiments will now be described. Starting from a top-left corner of a picture, traditional loop filtering approaches partition a picture into several equal size LFBs, except for those in a last row/column, which are remainders of the partitioning. That is, the LFBs in the last row/column may be a different size than those LFBs in other areas of the picture.

As described above LFBs are loop filtering blocks, which may be distinct from coding tree units (CTUs), which may also be called super blocks (SBs). For example, LFBs may be used for processes associated with loop filtering, such as filtering and training filter coefficients. While CTUs/SBs may be used as an LFB, generally LFBs cannot be used as a CTU/SB.

In some embodiments, the underlying partitioning, which may use CTUs or SBs, may further be partitioned into smaller LFBs, which in turn my be subjected to the loop filtering. This may provide an advantageous effect in increasing the accuracy of loop filtering outputs.

Disclosed herein, is a flexible partitioning of LFB (FPLFB), which allows the size of LFB in the first row/column to be smaller than other LFBs within the frame.

More specifically, the height of LFBs in the first row and/or the width of LFBs in the first column may be smaller than height and/or width of other LFBs (except for LFBs in the last row/column) within the frame. The LFBs in the last row and/or last column may also be smaller in size, i.e., the remainders of the partitioning may be smaller in size.

Figure 11:
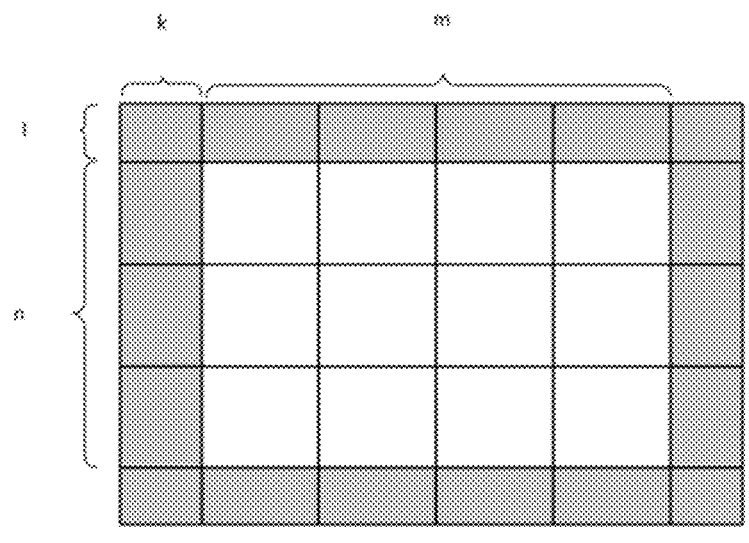
FIG. 11 is a schematic illustration of loop filtering block (LFB) partitioning.

In one embodiment, when the LFBs have a fixed m*n size, the LFBs in the first row and the first column may have a k*l, k*n, or m*l size, where m and n are positive integers which are smaller than a picture width and height, and k and l are positive integers which are less than m and n. FIG. 11 depicts an example of LFB partitioning when first and last row/column have smaller LFBs.

In one example, the proposed disclosure may be applied on the signaling and processing of CCALF in which CTU is the basic unit for filtering, i.e., CTU size is m*n.

In another example, the proposed disclosure may be applied on an ALF classification process which takes 4×4 Luma LFBs as input.

In another example, the proposed disclosure may be applied on a CDEF edge direction derivation process which takes 8×8 Luma LFBs as input.

In another example, the proposed disclosure may be applied on the signaling and processing of JCF.

As briefly discussed above, FIG. 11 presents an LFB partitioning example, where the first and last row/column have smaller LFBs (shown in gray) of values of m*n, which may include 32×32, 64×64, 128×128.

In one embodiment, when the LFBs are based on quadtree split, the LFBs in the first row and/or first column have smaller sizes than other LFBs in the same quadtree split level.

Figure 12:
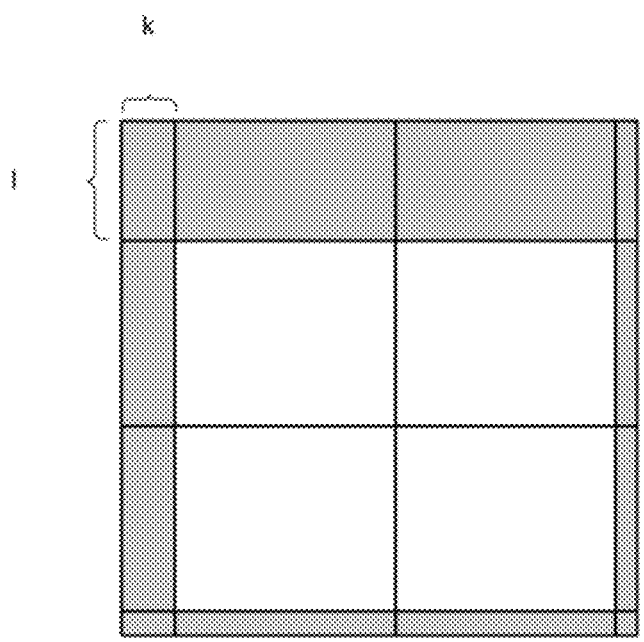
FIG. 12 is a schematic illustration of symmetric quadtree-based loop filtering block (LFB) partitioning.

In an embodiment, the height of LFBs in the first row and the width of LFBs in the first column are determined first, then, symmetric quadtree splitting is performed. The LFBs in the first row/column have smaller sizes than LFBs in the quadtree region. FIG. 12 depicts an example of symmetric quadtree-based LFB partitioning when the first and last row/column have smaller LFBs. Here, LFBs with no fill indicates symmetric quadtree-based partitioning, and LFBs filled with gray fill have smaller sizes than quadtree-based LFBs.

Figure 13:
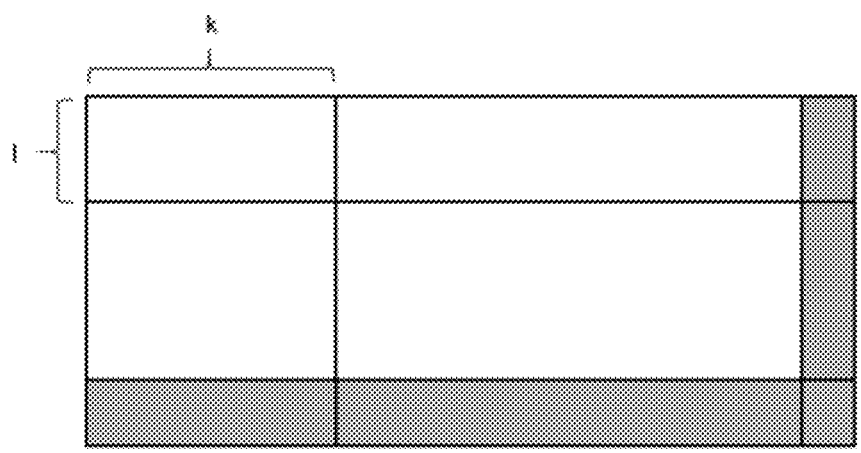
FIG. 13 is a schematic illustration of asymmetric quadtree-based loop filtering block (LFB) partitioning.

In an embodiment, asymmetric quadtree splitting is performed starting from the top-left corner of the frame. FIG. 13 depicts an example of asymmetric quadtree split. Here, LFBs with no fill indicates asymmetric quadtree-based partitioning, and LFBs filled with gray in the last row/column are remainders of the picture level quadtree partitioning.

In an embodiment, the proposed approach is applied on quadtree-based

Figure 14:
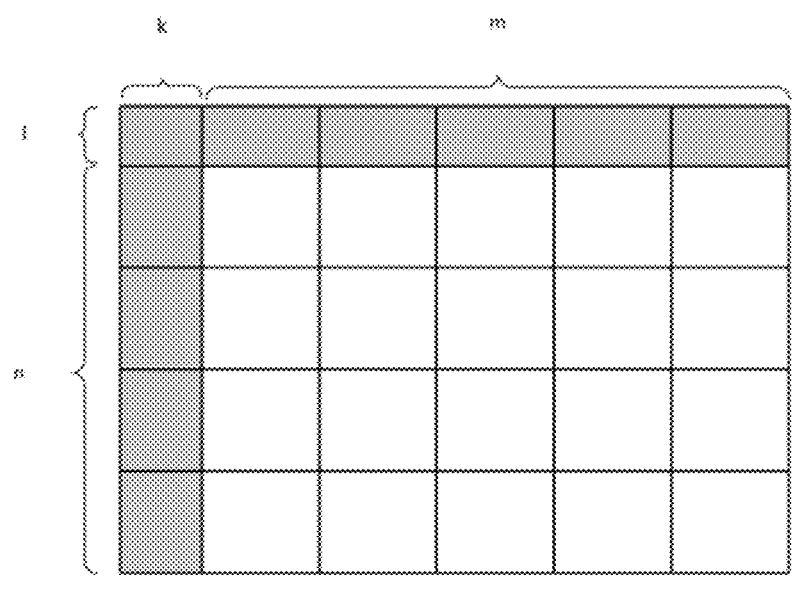
FIG. 14 is a schematic illustration of loop filtering block (LFB) partitioning.
Figure 15:
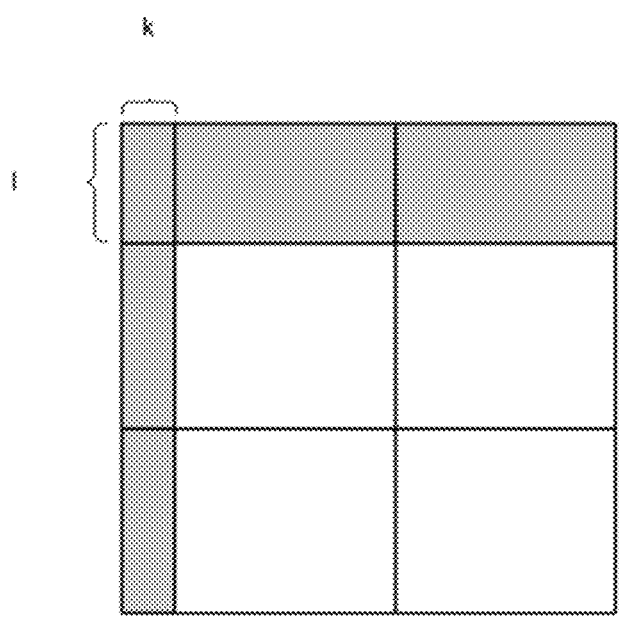
FIG. 15 is a schematic illustration of symmetric quadtree-based loop filtering block (LFB) partitioning.
Figure 16:
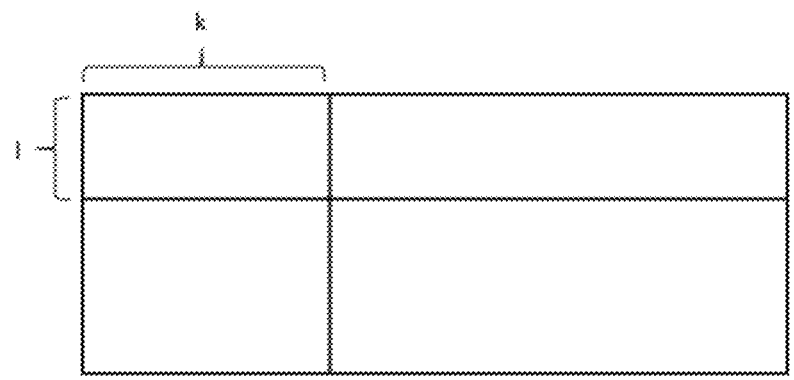
FIG. 16 is a schematic illustration of asymmetric quadtree-based loop filtering block (LFB) partitioning.

According to embodiments, only the first row and/or first column may have smaller LFBs, and no partitioning remainder is allowed in the last row/column. FIG. 14 depicts an example of LFB partitioning when only the first row and first column have smaller LFBs. FIG. 15 depicts an example of symmetric quadtree-based LFB partitioning when only the first row/column has smaller LFBs. FIG. 16 depicts an example of an asymmetric quadtree split.

According to embodiments, different loop filters may use different FPLFB schemes.

In one embodiment, deblocking, CDEF and LR may have different FPLFB schemes.

In one embodiment, deblocking, ALF, CCALF, and SAO may have different FPLFB schemes.

According to embodiments, different color components may use different FPLFB schemes.

In embodiments, Y, Cb and Cr may have different FPLFB schemes.

In embodiments, R, G and B may have different FPLFB schemes.

According to embodiments, the height of LFBs in the first row and the width of LFBs in the first column can be signaled in any parameter set (e.g., high-level syntax including DPS, VPS, SPS, PPS, APS etc.), slice header, tile/tile group header or SEI message.

According to embodiments, the size of LFBs in the first row and column may be hard-coded.

In one example, the height of LFBs in first row may be 32, and the width of LFBs in first column may be 32, and the rest of LFBs in the picture may be 128×128 (including the LFBs in the last row and last column).

According to embodiments, a binary flag may be signaled per sequence or per picture to indicate whether the first row of LFBs have smaller sizes; if so, a separate syntax may be signaled to indicate the height of the first row. The other binary flag may be signaled per sequence or per picture to indicate whether the first column of LFBs have smaller sizes. If so, a separate syntax may be signaled to indicate the width of first column.

In one example, two binary flags: lfb_first_row_smaller and lfb_first_column_smaller are signaled in SPS to indicate whether LFBs in first row and first column have smaller sizes. If so, lfb_first_row_height and lfb_first_column_width are signaled to indicate the height of first row and the width of first column.

According to embodiments, one separate syntax may be signaled to indicate the height of the first row, and another separate syntax may be signaled to indicate the width of the first column.

According to embodiments, one separate syntax is signaled to indicate the height of the first row and the width of the first column. That is, the height of the first row and the width of the first column may be identical.

According to embodiments, a separate syntax may be used to signal the specific loop filtering partitioning, e.g., height of the first and last rows and/or width of the first and last columns, that is different than syntaxes used to signal partitioning of coding tree units (CTU), which may also be called super blocks (SBs) (i.e., the underlying partitioning). The loop filtering partitioning may be the same as or different from the underlying CTU and SB partitioning. In some embodiments, the loop filtering partitioning may be adopted to use the underlying CTU and SB partitioning.

Also according to the disclosure, the loop filtering techniques and loop filtering partitioning can be applied to a frame including CTBs/SBs partitioned following a traditional partitioning scheme.

For example, a traditionally partitioning scheme can be modified such that the first row and/or first column are of different sizes, e.g. smaller, than the sizes assigned according to a traditional partitioning scheme. This will increase overall accuracy of applied loop filtering. Environments in which embodiments may run will now be described.

Figure 17:
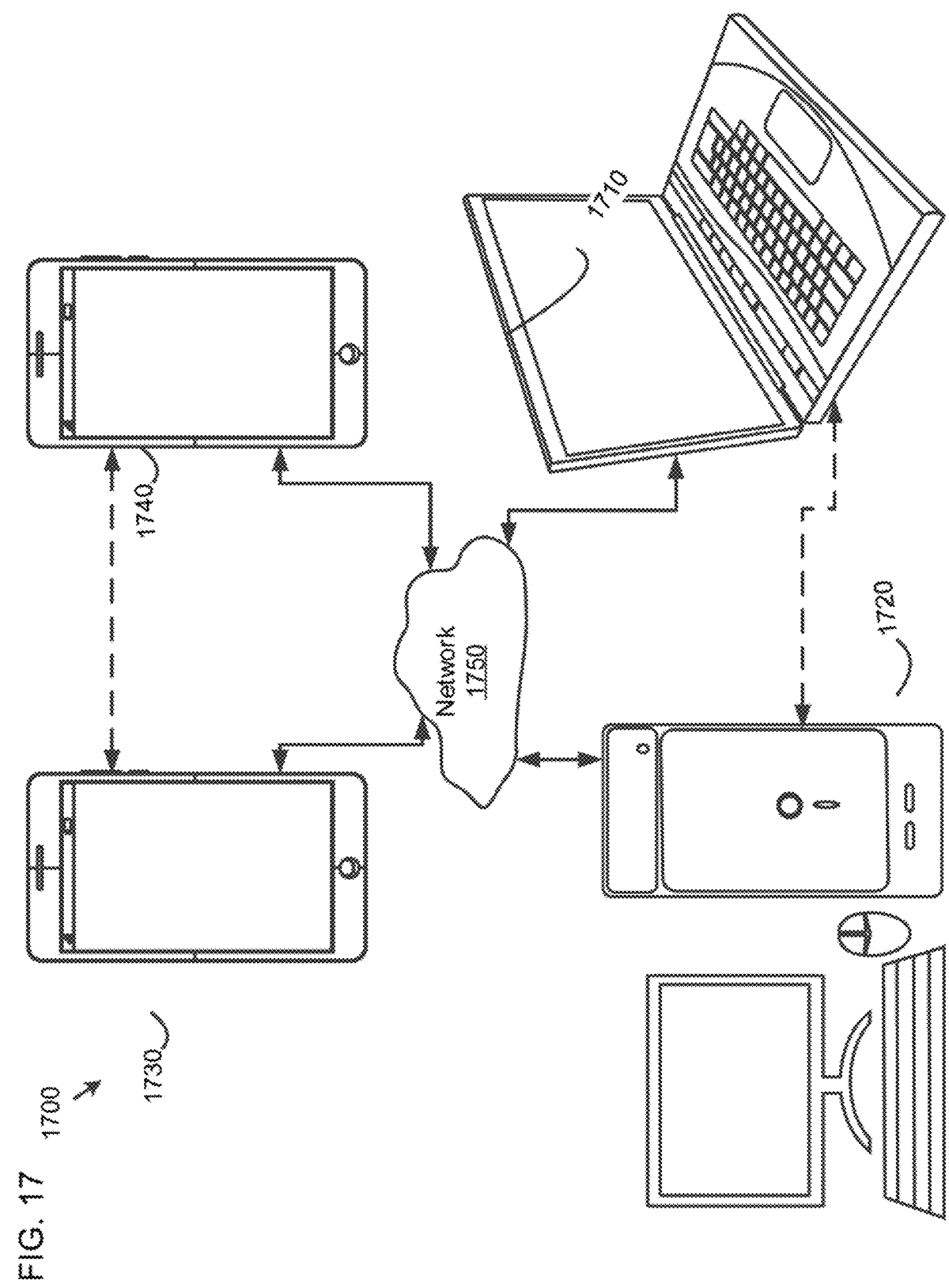
FIG. 17 is a block diagram of a communication system according to embodiments.

FIG. 17 is a block diagram of a communication system 1700 according to embodiments. The communication system 1700 may include at least two terminals 1710 and 1720 interconnected via a network 1750. For unidirectional transmission of data, a first terminal 1710 may code data at a local location for transmission to a second terminal 1720 via the network 1750. The second terminal 1720 may receive the coded data of the first terminal 1710 from the network 1750, decode the coded data and display the decoded data. Unidirectional data transmission may be common in media serving applications and the like.

FIG. 17 further illustrates a second pair of terminals 1730 and 1740 provided to support bidirectional transmission of coded data that may occur, for example, during videoconferencing. For bidirectional transmission of data, each terminal 1730 or 1740 may code data captured at a local location for transmission to the other terminal via the network 1750. Each terminal 1730 or 1740 also may receive the coded data transmitted by the other terminal, may decode the coded data and may display the decoded data at a local display device.

In FIG. 17, the terminals 1710-1740 may be illustrated as servers, personal computers and smartphones, but principles of the embodiments are not so limited. The embodiments find application with laptop computers, tablet computers, media players and/or dedicated video conferencing equipment. The network 1750 represents any number of networks that convey coded data among the terminals 1710-1740, including for example wireline and/or wireless communication networks. The communication network 1750 may exchange data in circuit-switched and/or packet-switched channels. Representative networks include telecommunications networks, local area networks, wide area networks and/or the Internet. For the purposes of the present discussion, an architecture and topology of the network 1750 may be immaterial to an operation of the embodiments unless explained herein below.

Figure 18:
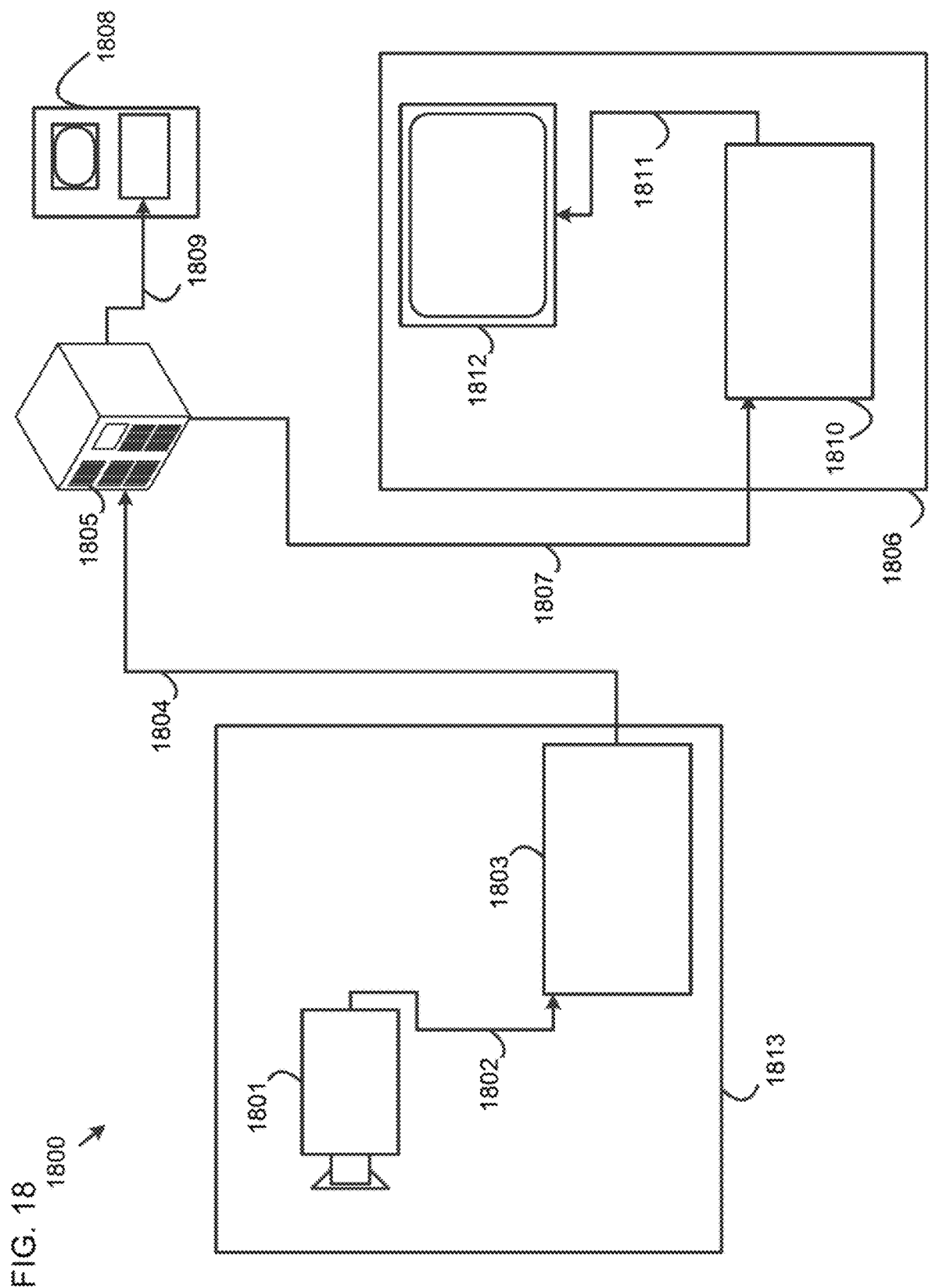
FIG. 18 is a diagram of a placement of a G-PCC compressor and a G-PCC decompressor in an environment, according to embodiments.

FIG. 18 is a diagram of a placement of a G-PCC compressor 1803 and a G-PCC decompressor 1810 in an environment, according to embodiments. The disclosed subject matter can be equally applicable to other enabled applications, including, for example, video conferencing, digital TV, storing of compressed data on digital media including CD, DVD, memory stick and the like, and so on.

A streaming system 1800 may include a capture subsystem 1813 that can include a source 1801, for example a digital camera, creating, for example, uncompressed data 1802. The data 1802 having a higher data volume can be processed by the G-PCC compressor 1803 coupled to the source 1801. The G-PCC compressor 1803 can include hardware, software, or a combination thereof to enable or implement aspects of the disclosed subject matter as described in more detail below. Encoded data 1804 having a lower data volume can be stored on a streaming server 1805 for future use. One or more streaming clients 1806 and 1808 can access the streaming server 1805 to retrieve copies 1807 and 1809 of the encoded data 1804. A client 1806 can include the G-PCC decompressor 1810, which decodes an incoming copy 1807 of the encoded data and creates outgoing data 1811 that can be rendered on a display 1812 or other rendering devices (not depicted). In some streaming systems, the encoded data 1804, 1807 and 1809 can be encoded according to video coding/compression standards. Examples of those standards include those being developed by MPEG for G-PCC.

The techniques, described above, can be implemented in a video encoder and/or decoder adapted for compression/decompression. The encoder and/or decoder can be implemented in hardware, software, or any combination thereof, and the software, if any, can be stored in one or more non-transitory computer readable media. For example, each of the methods (or embodiments), encoders, and decoders may be implemented by processing circuitry (e.g., one or more processors or one or more integrated circuits). In one example, the one or more processors execute a program that is stored in a non-transitory computer-readable medium.

The techniques, described above, can be implemented as computer software using computer-readable instructions and physically stored in one or more computer-readable media. For example, FIG. 19 shows a computer system 900 suitable for implementing certain embodiments of the disclosure.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 19:
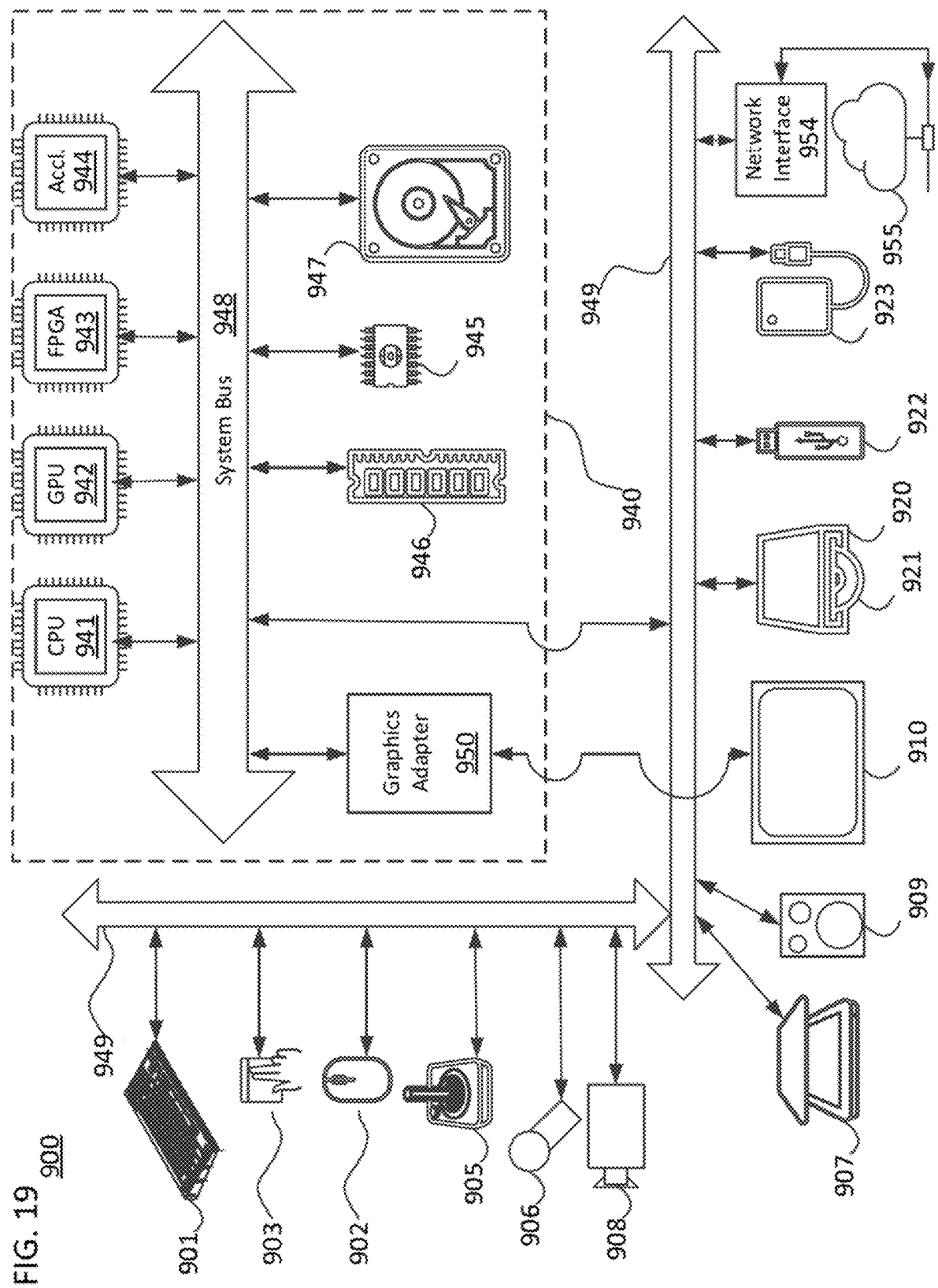
FIG. 19 is a diagram of a computer system suitable for implementing embodiments.

The components shown in FIG. 19 for computer system 900 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 900.

Computer system 900 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 901, mouse 902, trackpad 903, touch screen 910, data-glove, joystick 905, microphone 906, scanner 907, camera 908.

Computer system 900 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 910, data glove, or joystick 905, but there can also be tactile feedback devices that do not serve as input devices). For example, such devices may be audio output devices (such as: speakers 909, headphones (not depicted)), visual output devices (such as screens 910 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 900 can also include human accessible storage devices and their associated media such as optical media including CD/DVD ROM/RW 920 with CD/DVD or the like media 921, thumb-drive 922, removable hard drive or solid state drive 923, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 900 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 949 (such as, for example USB ports of the computer system 900; others are commonly integrated into the core of the computer system 900 by attachment to a system bus as described below (for example Ethernet interface into a PC computer system or cellular network interface into a smartphone computer system). Using any of these networks, computer system 900 can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment 955. Certain protocols and protocol stacks can be used on each of those networks and network interfaces as described above.

Aforementioned human interface devices, human-accessible storage devices, and network interfaces 954 can be attached to a core 940 of the computer system 900.

The core 940 can include one or more Central Processing Units (CPU) 941, Graphics Processing Units (GPU) 942, specialized programmable processing units in the form of Field Programmable Gate Areas (FPGA) 943, hardware accelerators for certain tasks 944, and so forth. These devices, along with Read-only memory (ROM) 945, Random-access memory 946, internal mass storage such as internal non-user accessible hard drives, SSDs, and the like 947, may be connected through a system bus 948. In some computer systems, the system bus 948 can be accessible in the form of one or more physical plugs to enable extensions by additional CPUs, GPU, and the like. The peripheral devices can be attached either directly to the core's system bus 948, or through a peripheral bus 949. Architectures for a peripheral bus include PCI, USB, and the like. A graphics adapter 950 may be included in the core 940.

CPUs 941, GPUs 942, FPGAs 943, and accelerators 944 can execute certain instructions that, in combination, can make up the aforementioned computer code. That computer code can be stored in ROM 945 or RAM 946. Transitional data can be also be stored in RAM 946, whereas permanent data can be stored for example, in the internal mass storage 947. Fast storage and retrieve to any of the memory devices can be enabled through the use of cache memory, that can be closely associated with one or more CPU 941, GPU 942, mass storage 947, ROM 945, RAM 946, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 900, and specifically the core 940 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 940 that are of non-transitory nature, such as core-internal mass storage 947 or ROM 945. The software implementing various embodiments of the present disclosure can be stored in such devices and executed by core 940. A computer-readable medium can include one or more memory devices or chips, according to particular needs. The software can cause the core 940 and specifically the processors therein (including CPU, GPU, FPGA, and the like) to execute particular processes or particular parts of particular processes described herein, including defining data structures stored in RAM 946 and modifying such data structures according to the processes defined by the software. In addition or as an alternative, the computer system can provide functionality as a result of logic hardwired or otherwise embodied in a circuit (for example: accelerator 944), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method of performing loop filtering in a video decoding process by at least one processor, the method comprising:
    receiving a video bitstream comprising encoded video data corresponding to a plurality of frames;
    partitioning the plurality of frames into a plurality of loop filtering blocks (LFBs), wherein the plurality of LFBs includes:
        one or more LFBs corresponding to at least a first row or a first column of the plurality of frames and having a first size, and
        a set of LFBs corresponding to other portions of the plurality of frames and having a second size, greater than the first size; and
    applying one or more loop filters to the plurality of LFBs.

2. The method of claim 1, wherein the partitioning is performed such that the at least first row or first column of the frames has smaller LFBs than all other portions of the plurality of frames.

3. The method of claim 1, wherein the partitioning is performed such that the at least first row or first column of the plurality of frames has smaller LFBs than other portions of the plurality of frames, except for at least one of a last row and last column of the plurality of frames.

4. The method of claim 1, wherein at least one of a width or height of the at least first row or first column of the plurality of frames is signaled separately.

5. The method of claim 1, wherein the partitioning is performed such that a width and height of the at least first row or first column of the plurality of frames is the same.

6. The method of claim 1, wherein the partitioning is performed such that a width and height of the at least first row or first column is hard coded.

7. The method of claim 1, wherein applying the one or more loop filters to the plurality of LFBs comprises applying more than one type of loop filter to the plurality of LFBs.

8. The method of claim 1, wherein applying the one or more loop filters to the plurality of LFBs comprises applying at least one of: an adaptive loop filter, a sample adaptive offset filter, a deblocking filter, a constrained directional enhancement filter, and a joint component filter.

9. The method of claim 1, wherein LFBs corresponding to an interior of a frame of the plurality of frames have the second size, LFBs corresponding to a non-corner exterior of the frame have the first size, and LFBs corresponding to a corner of the frame have a third size, different than the first and second sizes.

10. The method of claim 1, wherein the second size is 32 samples by 32 samples, 64 samples by 64 samples, or 128 samples by 128 samples.

11. The method of claim 1, wherein the second size corresponds to a coding tree unit.

12. The method of claim 1, wherein the video bitstream further comprises an indicator that indicates size information for the plurality of LFBs, and wherein the partitioning is performed in accordance with the size information.

13. The method of claim 1, wherein the plurality of frames are partitioned into the plurality of LFBs based on a quadtree split.

14. A computing system, comprising:
control circuitry;
memory; and
one or more sets of instructions stored in the memory and configured for execution by the control circuitry, the one or more sets of instructions comprising instructions for:
receiving video data comprising a plurality of frames;
when the plurality of frames are to be partitioned into a plurality of loop filtering blocks (LFBs) having two or more distinct sizes, signaling, in a video bitstream, an indicator that indicates size information for the plurality of LFBs; and
signaling the plurality of frames in the video bitstream.

15. The computing system of claim 14, wherein the indicator indicates that the plurality of LFBs includes one or more LFBs having a first size and corresponding to at least a first row or a first column of the plurality of frames, and a set of LFBs having a second size, greater than the first size, and corresponding to other portions of the plurality of frames.

16. The computing system of claim 15, further comprising signaling a second indicator that indicates a height of LFBs in the first row of the plurality of frames.

17. The computing system of claim 14, further comprising signaling, in the video bitstream, one or more loop filter operations using the plurality of LFBs.

18. The computing system of claim 14, wherein the two or more distinct sizes include a size of: 32 samples by 32 samples, 64 samples by 64 samples, or 128 samples by 128 samples.

19. A non-transitory computer-readable storage medium storing one or more sets of instructions configured for execution by a computing device having control circuitry and memory, the one or more sets of instructions comprising instructions for:
processing a bitstream of visual media data according to a format rule, wherein:
the bitstream includes coded information including a plurality of frames; and
the format rule specifies that the plurality of frames are to be partitioned into a plurality of loop filtering blocks (LFBs) that includes:
one or more LFBs having a first size and corresponding to at least a first row or a first column of the plurality of frames, and
a set of LFBs having a second size, greater than the first size, and corresponding to other portions of the plurality of frames.

* * * * *